US011204851B1

(12) United States Patent
Iyengar et al.

(10) Patent No.: US 11,204,851 B1
(45) Date of Patent: Dec. 21, 2021

(54) REAL-TIME DATA QUALITY ANALYSIS

(71) Applicant: International Business Machines Corporation, Armonk, NY (US)

(72) Inventors: Arun Kwangil Iyengar, Yorktown Heights, NY (US); Anuradha Bhamidipaty, Yorktown Heights, NY (US); Dhavalkumar C. Patel, White Plains, NY (US); Shrey Shrivastava, White Plains, NY (US); Nianjun Zhou, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/944,702

(22) Filed: Jul. 31, 2020

(51) Int. Cl.
*G06F 11/00* (2006.01)
*G06F 11/30* (2006.01)
*G06F 11/07* (2006.01)
*G06F 11/34* (2006.01)

(52) U.S. Cl.
CPC ...... *G06F 11/3072* (2013.01); *G06F 11/0793* (2013.01); *G06F 11/3006* (2013.01); *G06F 11/3466* (2013.01)

(58) Field of Classification Search
CPC ............ G06F 11/3072; G06F 11/0793; G06F 11/3006; G06F 11/3466
See application file for complete search history.

(56) References Cited

U.S. PATENT DOCUMENTS 7,505,868 B1    3/2009  Shan
8,887,286 B2   11/2014  Dupont et al.
9,838,506 B1   12/2017  Cronin
10,681,056 B1   6/2020  Badawy et al.
2008/0021945 A1  1/2008  Hamilton et al.
(Continued)

FOREIGN PATENT DOCUMENTS

| CN | 109254959 A | 1/2019 |
| CN | 111209274 A | 5/2020 |
| CN | 111427974 A | 7/2020 |

OTHER PUBLICATIONS

Anonymous, "User Interface and Application Programming Interface for Explaining Personalized Machine-Learned Model Outputs," IPCOM000252271D, Jan. 3, 2018, 34 pages.
(Continued)

*Primary Examiner* — Charles Ehne
(74) *Attorney, Agent, or Firm* — Cantor Colburn LLP; Joseph Petrokaitis

(57) ABSTRACT

Embodiments of the invention are directed a computer-implemented method for assessing data quality. A non-limiting example of the computer-implemented method includes using a processor to receive a plurality of updates to data points in a data stream. The processor is further used to compute instances of a data quality metric (DQM) from the data points in the data stream. The instances of the DQM are configured to differentiate the data points in the data stream by time and assign a higher weight to the instances of the DQM computed from more recent data points in the data stream. The instances of the DQM are continuously updated as more of the data points are received by the processor while limiting cycles of the processor consumed by updating the instances of the DQM to a threshold.

25 Claims, 30 Drawing Sheets

(56) References Cited

U.S. PATENT DOCUMENTS

| | | | |
|---|---|---|---|
| 2008/0195430 A1 | 8/2008 | Rustagi | |
| 2008/0260042 A1* | 10/2008 | Shah | H04N 19/134 375/240.25 |
| 2010/0005346 A1* | 1/2010 | Hamlescher | G06Q 10/06 714/57 |
| 2011/0016469 A1* | 1/2011 | Klein | H04L 47/12 718/100 |
| 2013/0006931 A1 | 1/2013 | Nelke et al. | |
| 2013/0218846 A1 | 8/2013 | Laredo et al. | |
| 2016/0246822 A1 | 8/2016 | George et al. | |
| 2020/0027018 A1 | 1/2020 | Daly et al. | |
| 2020/0327103 A1* | 10/2020 | Anand | G06F 11/1464 |

OTHER PUBLICATIONS

Anonymous. "Applying machine learning techniques to determine product risks." IPCOM000256883D. Jan. 2019. 29 pages.

Anonymous. "Correcting Image Anomalies Using Machine Learning." IPCOM000252094D. Dec. 2017. 36 pages.

Anonymous. "Identifying Sources of a Change in Metrics of a Stack of Servers." IPCOM000252099DD. Dec. 2017. 34 pages.

Anonymous. "Predicting Computing Prices Dynamically Using Machine Learning." IPCOM000252018D. Dec. 2017. 35 pages.

Dama UK Working Group "The Six Primary Dimensions for Data Quality Assessment: Defining Data Quality Dimensions." (2013). 17 pages.

Debattista et al. "Luzzu—A Methodology and Framework for Linked Data Quality Assessment." Journal of Data and Information Quality (JDIQ) 8.1 (2016): 1-32.

Dhurandhar et al. "Efficient and Accurate Methods for Updating Generalized Linear Models with Multiple Feature Additions." The Journal of Machine Learning Research 15.1 (2014): 2607-2627.

Gordon et al. "Deriving an adjusted rate of human analysis by factoring in performance as the sum of weighted accuracy rates." IPCOM000237525D. Jun. 2014. 3 pages.

Heinrich et al. "Metric-based Data Quality Assessment—Developing and Evaluating a Probability-based Currency Metric." Decision Support Systems 72 (2015): 82-96.

Heinrich et al. "Requirements for Data Quality Metrics." Journal of Data and Information Quality (JDIQ) 9.2 (2018) 1-32.

Iyengar et al., "Efficient Real-Time Data Quality Analysis," U.S. Appl. No. 16/944,715, filed Jul. 31, 2020.

Lidiansa. "Developing Data Quality Metrics for a Product Master Data Model." Delft University of Technology. Dissertation. Elsevier BV. 2014. 93 pages.

List of IBM Patents or Patent Applications Treated as Related; Date Filed: Jul. 31, 2020, 2 pages.

Loshin. "Monitoring Data Quality Performance Using Data Quality Metrics." Informatica Corporation (2006). 22 pages.

McMahan et al. "Open Problem: Better Bounds for Online Logistic Regression." 25th Annual Conference on Learning Theory. 2012. pp. 44.1-44.3.

Schelter et al. "Automating Large-Scale Data Quality Verification." Proceedings of the VLDB Endowment 11.12 (2018): 1781-1794.

Schelter et al. "Differential Data Quality Verification on Partitioned Data." 2019 IEEE 35th International Conference on Data Engineering (ICDE). IEEE. 2019. 6 pages.

Shrivastava et al. "DQA: Scalable, Automated and Interactive Data Quality Advisor." 2019 IEEE International Conference on Big Data. IEEE. 2019. pp. 2913-2922.

Strehl et al. "Online Linear Regression and Its Application to Model-Based Reinforcement Learning." Advances in Neural Information Processing Systems. 2008. pp. 1-8.

International Search Report; International Application No. PCT/IB2021/056095 ; International Filing Date: Jul. 7, 2021 dated Oct. 12, 2021; p. 8.

International Search Report; International Application No. PCT/IB2021/056097 ; International Filing Date: Jul. 7, 2021 dated Sep. 28, 2021 ; 8 pages.

* cited by examiner

Example Data Quality Checks in Validator 110

- Null values
- Infinity values
- Duplicate and repeated values
- Uniqueness checks
- Remediation
  - Data imputation of missing values
- Univariate and Multivariate checks
  - In multivariate data, determine if different features are related
- Time series checks, such as
  - Sufficient duration
  - Minimum frequency
  - Duplicate timestamps
  - Missing data
  - Trend, seasonality, outliers
- Other data quality checks

FIG. 2

Time Series Data 300

```
import pandas as pd
carbs = ['pizza', 'hamburger', 'rice']
pd.Series(carbs)

0 'pizza'
1 'hamburger'
2 'rice' dType: object
```

Data Frame with Time Intervals 400

| Customer Number | First Name | Last Name | Billing Address | Shipping Address | Email |
|---|---|---|---|---|---|
| 00001 | John | Smith | 111 Main City Street | NULL | john@example.com |
| 00002 | Jane | Smith | 211 Main City Street | 112 Main City Street | jane@example.com |
| 00003 | Jack | Smith | 311 Main City Street | NULL | jack@example.co (email truncated) |
| 00004 | Paul | Smith | Billing Address (a default entry) | NULL | paul@example.com |
| 00005 | Mary | Smith | 511 Main City Street | 511 Main City Street | mary@example.com |
| 00006 | Peter | Jones | 611 Main City Street | 611 Main City Street | peter@example.com |
| 00007 | Eric | NULL | 711 Main City Street | 611 Main City Street | eric@example.com |
| 00008 | Ruth | Jones | 811 Main City Street | 811 Main City Street | ruth@example.com |
| 00009 | Amy | Jones | 911 Main City Street | 911 Main City Street | amy@example.com |
| 00010 | Scott | Jones | 1011 Main City Street | 1011 Main City Street | scott@example.com |

Columns → Rows ↓

Time Interval / Full Data Set

FIG. 4

General Case Incremental Computations of DQMs in DQA System 100

- Type I Data Quality Checks
    - check_duplicate_column_names
    - check_column_name
    - check_column_data_type
- Type II Data Quality Checks
    - check_na_columns
    - check_specific_element_column
    - check_infinity_column
    - check_zero_ratio_column
    - check_constant_columns
    - check_duplicate_values
    - check_most_occurring_values
    - check_low_variance_variables

FIG. 12

$$Q(D_W) = Q(\{D_1, D_2, \ldots, D_n\}) = \sum_{i=1}^{j=n} Q(D_i) \quad \text{Type I – Equation 1}$$

$$Q(D_W \cup D_W) = \sum_{i=1}^{j=n} Q(D_i) + Q(D_{n+1}) = Q(D_W) + Q(D_{n+1}) \quad \text{Type I – Equation 2}$$

$$Q(D) = Q(\{D_1, D_2, \ldots, D_n\}) = \frac{\sum_{i=1}^{j=n} P(D_i)}{\sum_{i=1}^{j=n} C(D_i)} \quad \text{Type II – Equation 3}$$

$$Q(D_W \cup D_{n+1}) = \frac{\sum_{i=1}^{j=n} P(D_i) + P(D_{n+1})}{\sum_{i=1}^{j=n} C(D_i) + C(D_{n+1})} = \frac{P(D_W) + P(D_{n+1})}{C(D_W) + C(D_{n+1})} \quad \text{Type II – Equation 4}$$

FIG. 15

Assume that the weight for each Data Chunk is: $\{W_i\}$ for $i \in [1,2,...,n]$ $D_W = \{D_1, D_2, ..., D_n\}$, ordered over time:

$$Q(D_W) = \sum_{i=1}^{i=n} w_i * Q(D_i) \qquad \text{Type I - Equation 5}$$

$D_W = \{D_1, D_2, ..., D_n\}$, ordered over time:

$$Q(D_W) = \frac{\sum_{i=1}^{i=n} w_i * P(D_i)}{\sum_{i=1}^{i=n} w_i * C(D_i)} \qquad \text{Type II - Equation 6}$$

FIG. 16

Example: State Information for DQA System 100

- Data can be passed to the DQA System 100 as Python data-frames
- Data-frames include intervals (e.g., shown in FIG. 4) which are ranges of consecutive rows representing a subset of full data sets
- Incremental methods have a parameter, interval_info_list, where each element in the list contains information about the interval:
  - Row numbers corresponding to the interval
  - Other fields corresponding to data quality metrics for the interval:
    - check_na_columns: column counts of null values
    - check_specific_element_column: column proportions of missing values
    - check_infinity_column: column proportions of infinity values
    - check_zero_ratio_column: column proportions of zero values
    - Etc.
- check_na_columns_incremental(df, row_offset, interval_info_list)
  - df may only be a portion of the data set. If row_offset > 0, previous rows of the dataset were analyzed earlier
  - row_offset represents the true row number of the first row of df
  - interval_info_list: results from analyses of previous rows of the same data set
  - check_na_columns_incremental analyzes df, appends the results to interval_info_list, and returns the updated value of interval_info_list

FIG. 19

Example: Analyzing Data Quality Metrics Over Time Intervals

- analyze_data_by_interval(interval_info_list):
- Analyzes data quality metrics across several intervals
  - Aggregate analysis across longer time intervals
  - Analysis for individual time intervals
  - Detect trends, anomalies across different time intervals

- check_na_columns_incremental gives proportions of NaNs over:
- Entire data range
- Only for most recent data
- Changing proportion over time plotted as a graph
- Using different weighting schemes (e.g., exponentially weighted moving average) to weight more recent data with higher weights

FIG. 20

Efficient Prioritization of DQM Computations 770A

- Several ranking functions can be used for r
- Example: rating = $a*o + b*f + c*i$
  - a is a negative constant, b, and c are positive constants
  - o: overhead for computing data quality constraint
  - f: frequency of change seen in past computations of data quality constraint
  - i: importance of data quality constraint (default value of 1 if not provided)
- Ranking function r orders constraints in decreasing order by ratings

FIG. 24

Efficient Prioritization of DQM Computations 770B

- Several rating functions can be used for r1
- Example: $r1 = a*o + b*f + c*i$
  - a is a negative constant, b, and c are positive constants
  - o: overhead for computing data quality constraint
  - f: frequency of change seen in past computations of data quality constraint
  - i: importance of data quality constraint (default value of 1 if not provided)
- r1 values represent relative frequencies for which sub-module 770B should update a data quality metric
  - All r1 values should be positive
- In order to ensure that all data quality metrics are computed at least some of the time, even if tmax is always exceeded, ratio between highest and lowest values should not be too high

FIG. 26

REAL-TIME DATA QUALITY ANALYSIS

BACKGROUND

The present invention relates generally to programmable computers, and more specifically to programmable computers, computer-implemented methods, and computer program products that implement new data quality metrics and related data quality analysis techniques. In accordance with aspects of the invention, the new data quality metrics and related data quality analysis techniques are configured to efficiently allocate and utilize the computing resources required to perform incremental data quality analysis on data sets having new or updated data that changes over time.

In computer processor applications, the phrase "big data" refers to extremely large data sets that can be analyzed computationally to reveal patterns, trends, and associations, especially those relating to human behavior and interactions. Big data can be leveraged by sophisticated computational analysis systems such as machine learning (ML) algorithms, artificial intelligence (AI) algorithms, deep learning algorithms, internet of things (IoT) systems, and the like. Because the demand for ML experts has outpaced the supply, user-friendly automated ML/AI computer systems have been developed. Known automated AI/ML systems can automate a variety of AI/ML development tasks such as model selection, hyper-parameter optimization, automated stacking (ensembles), neural architecture searching, pipeline optimization, and feature engineering.

The performance of automated ML/AI systems depends heavily on how well the system's training data has been qualitatively cleaned and analyzed to make the data suitable for effective consumption by ML models. If undetected, poor data quality can cause large deviations in the analysis performed by sophisticated AI/ML systems, thereby generating inaccurate and misleading results. Because the process of identifying and addressing data quality issues can be labor intensive, a scalable, automated, and interactive data quality tool/system known as the Data Quality Advisor system or the DQLearn system has been developed by IBM®. For ease of description, the terms data quality analysis (DQA) system are used herein to refer, collectively, to the Data Quality Advisor (or DQLearn) system, as well as other known data quality analysis systems having similar features as the DQA/DQLearn system. The framework of the DQA system performs a variety of data quality analysis tasks including automatically generating dynamic executable graphs for performing data validations fine-tuned for a given dataset; building a library of validation checks common to many applications; and applying different tools to address the persistence and usability issues that make data cleaning a laborious task for data scientists.

DQA systems perform data quality checks on data sets that are constantly being streamed through a data quality analysis pipeline. The data quality checks involve measuring and/or analyzing different features or characteristics of the data sets to generate data quality metrics (DQMs) that provide a user with feedback on data quality. For example, a known data quality check is to identify/measure NULL values in a data set, and a known corresponding DQM is the percentage of NULL values in the data set. In many instances, the data-under-analysis includes data that has been previously checked for data quality, along with data that has not been previously checked for data quality (i.e., new/updated data).

DQA systems continuously update DQM measurements as new/updated data is received, and recalculating these DQMs can consume a significant amount of computational resources. To address this problem, known DQA systems can compute DQMs incrementally, which means that, instead of taking the computationally expensive approach of re-computing DQMs on the entire initial data set each time the data set comes up for a data quality evaluation, DQMs are computed "incrementally" by computing the DQMs for the new/updated data and combining them with DQM information that was previously computed for the unchanged portion(s) of the initial data set.

Data quality analysis techniques that incrementally compute DQMs for new/updated data provide a level of computing resource efficiency over data quality analysis techniques that do not compute DQMs incrementally for new/updated data. However, in known data quality analysis techniques, the DQMs themselves are static and do not take into account the fact that, when viewed over selected time windows, the new/updated data from which the DQMs are derived is non-static and constantly changing. Accordingly, known data quality analysis techniques that incrementally determine DQMs for new/updated data still lack efficiency in their allocation and use of computing resources because known data quality analysis techniques are not well matched to new/updated data that is constantly changing over time.

SUMMARY

Embodiments of the invention are directed to a computer-implemented method for assessing data quality. A non-limiting example of the computer-implemented method includes using a processor to receive a plurality of updates to data points in a data stream. The processor is further used to compute instances of a data quality metric (DQM) from the data points in the data stream. The instances of the DQM are configured to differentiate the data points in the data stream by time and assign a higher weight to the instances of the DQM computed from more recent data points in the data stream. The instances of the DQM are continuously updated as more of the data points are received by the processor while limiting cycles of the processor consumed by updating the instances of the DQM to a threshold.

The above-described computer-implemented method provides improvements over known methods of assessing data quality by providing DQMs that differentiate data points over time and assign a higher weight to DQM computed from recent data points. Accordingly, the above-described computer-implemented method efficiently allocates computing resources because it computes DQMs in a manner that is well matched to incoming data points that are constantly changing over time.

The above-described computer-implemented method can further include using the processor to generate data quality assessments using the instances of the DQM across multiple time ranges; select a data quality remediation strategy based at least in part on the data quality assessment; and apply the data quality remediation strategy to the data stream.

The above-described computer-implemented method provides improvements over known methods of assessing data quality by generating data quality assessments using instance of the DQM across multiple time ranges. Accordingly, the above-described computer-implemented method efficiently allocates computing resources because it computes DQMs in a manner that is well matched to incoming data points that are constantly changing over time Embodiments of the invention are direct to a computer-implemented method for assessing data quality. A non-limiting example of the computer-implemented method includes using a processor to receive a plurality of updates to data points in a data stream. The processor is further used to compute instances of a DQM from the data points in the data stream. Instances of the DQM computed over a plurality of time intervals are analyzed. The processor is further used to determine that at least one of the plurality of time intervals has an anomalous value for an instance of the DQM computed during the at least one of the plurality of time intervals; and compute a weighted aggregate value of an instance of the DQM across the plurality of time intervals. Instances of the DQM in time intervals of the plurality of time intervals with the anomalous value are assigned lower values of the weighted aggregate value.

The above-described computer-implemented method provides improvements over known methods of assessing data quality by identifying anomalous data points over multiple time intervals and assigning a lower weight to data points that are identified as anomalous. Accordingly, the above-described computer-implemented method efficiently allocates computing resources because it identifies anomalous behavior among the data points in a manner that is well matched to incoming data points that are constantly changing over time.

The above-described computer-implemented method can further include that the instances of the DQM in the time intervals of the plurality of time intervals with the anomalous value are assigned the lower values of the weighted aggregate value based on a computed severity level of the anomalous value.

The above-described computer-implemented method provides improvements over known methods of assessing data quality by identifying the severity of anomalous data points over multiple time intervals and assigning a lower weight to data points that are identified as anomalous based on a measured severity of the anomaly. Accordingly, the above-described computer-implemented method efficiently allocates computing resources because it identifies anomalous behavior among the data points in a manner that is well matched to incoming data points that are constantly changing over time.

Embodiments of the invention are also directed to computer systems and computer program products having substantially the same features and functionality of the above-described computer-implemented methods.

Embodiments of the invention are directed to a computer program product for assessing data quality. The computer program product includes a computer readable storage medium having program instructions embodied therewith, the program instructions executable by a processor system to cause the processor system to perform operations. The operations includes receiving a plurality of updates to data points in a data stream, and computing instances of a DQM from the data points in the data stream, where the instances of the DQM are configured to differentiate the data points in the data stream by time and assign a higher weight to the instances of the DQM computed from more recent data points in the data stream. The operations further include continuously updating the instances of the DQM as more of the data points are received by the processor while limiting cycles of the processor consumed by updating the instances of the DQM to a threshold. Instances of the DQM computed over a plurality of time intervals are analyzed, and it is determined that at least one of the plurality of time intervals has an anomalous value for an instance of the DQM computed during the at least one of the plurality of time intervals. A weighted aggregate value of an instance of the DQM across the plurality of time intervals is computed, where instances of the DQM in time intervals of the plurality of time intervals with the anomalous value are assigned lower values of the weighted aggregate value.

The above-described computer program product provides improvements over known methods of assessing data quality by providing DQMs that differentiate data points over time and assign a higher weight to DQM computed from recent data points. The above-described computer program product further provides improvements over known methods of assessing data quality by identifying anomalous data points over multiple time intervals and assigning a lower weight to data points that are identified as anomalous. Accordingly, the above-described computer program product efficiently allocates computing resources because it computes DQMs and identifies anomalous data points in a manner that is well matched to incoming data points that are constantly changing over time.

Embodiments of the invention are also directed to computer-implemented methods and computer systems having substantially the same features and functionality of the above-described computer program product.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 2 depicts examples of data quality checks that can be executed by the DQA system shown in FIG. 1;

FIG. 4 depicts an example of a data-frame with time intervals in accordance with aspects of the invention, wherein the data-frame with time intervals is capable of being analyzed by the real-time DQA features of the DQA system shown in FIG. 1;

FIG. 12 depicts examples of DQMs that can be computed incrementally using the sub-module for performing general case incremental computations of DQMs shown in FIGS. 7 and 11;

FIG. 15 depicts equations that can be implemented by the computer-implemented methods and sub-modules shown in FIGS. 7, 11, 13, and 14;

FIG. 16 depicts additional equations that can be implemented by the computer-implemented methods and sub-modules shown in FIGS. 7, 11, 13, and 14;

FIG. 19 depicts an example of how state information can be maintained for the DQA system shown in FIG. 1 using transactional tabular checks in accordance with aspects of the invention;

FIG. 20 depicts an example of how DQMs can be analyzed over time intervals using the DQA system shown in FIG. 1 in accordance with aspects of the invention;

FIG. 24 depicts additional details of how computer-implemented methods can be executed by the sub-module for efficiently prioritizing DQM computations in accordance with aspects of the invention using the real-time DQA module of the DQA system shown in FIGS. 7 and/or 19;

FIG. 26 depicts additional details of how computer-implemented methods can be executed by the sub-module for efficiently prioritizing DQM computations in accordance with aspects of the invention using the real-time DQA module of the DQA system shown in FIGS. 7 and/or 19;

Figure 1:
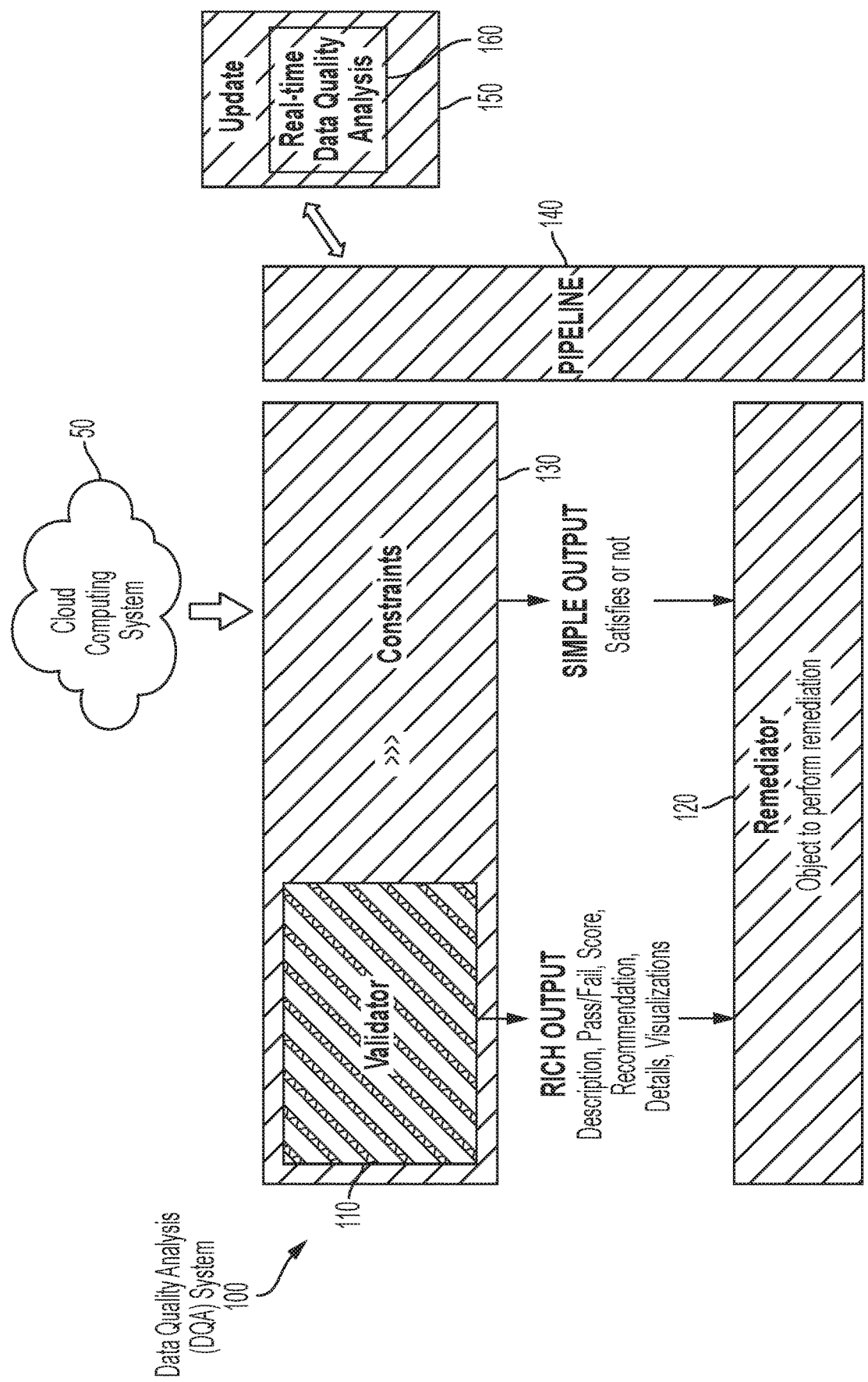
FIG. 1 depicts a data quality analysis (DQA) system having a real-time DCA module configured to implement a variety of real-time, non-static data quality analysis features in accordance with aspects of the invention.

In the accompanying figures and following detailed description of the disclosed embodiments, the various elements illustrated in the figures are provided with three digit reference numbers, where appropriate. The leftmost digit of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification have been labeled as modules. Embodiments of the present invention apply to a wide variety of module implementations. For example, a module can be implemented as a hardware circuit configured to include custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. A module can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, include the module and achieve the stated purpose for the module.

As previously noted herein, configuring data quality analysis systems to incorporate known techniques for incrementally computing DQMs for new/updated data provides greater computing resource efficiency over data quality analysis system that do not compute DQMs incrementally for new/updated data. However, in known techniques for computing DQMs incrementally, the DQMs themselves are static and do not take into account the fact that, when viewed over selected time windows, the new/updated data from which the DQM is derived is non-static and constantly changing. Accordingly, known techniques for incrementally determining DQMs for new/updated data still lack efficiency in their allocation and use of computing resources because known techniques for incrementally determining DQMs are not well matched to new/updated data that is constantly changing over time.

Embodiments of the invention address and overcome the shortcomings of known incremental DQM computation techniques by providing computer-implemented methods, programmable computing systems, and computer program products configured and arranged to efficiently allocate and utilize the computational resources that are required to perform data quality analysis techniques that compute DQMs incrementally for new/updated data. More specifically, embodiments of the invention improve the efficiency of computational resource allocation and use by providing DQMs and related data quality analysis techniques that are well matched to new/updated data that is constantly changing over time because the DQMs and related data quality analysis techniques in accordance with aspects of the invention are both incremental and non-static. More specifically, the DQMs and related data quality analysis techniques in accordance with aspects of the invention are non-static in that they take into account the fact that, when viewed over selected time windows, the new/updated data from which the DQMs and related data quality analysis techniques are derived is non-static and constantly changing. Accordingly, DQA systems having incremental and non-static data quality analysis features in accordance with aspects of the invention improve the efficiency of computer resource allocation and use over DQA systems that only provide incremental data quality analysis features.

In aspects of the invention, a DQA system having incremental and non-static data quality analysis features in accordance with embodiments of the invention is configured to include a real-time DQA module having multiple computer-implemented sub-modules that perform real-time data quality analysis of changing data by defining multiple incremental DQMs that are changing over time. The multiple sub-modules in the real-time DQA module include a sub-module for computing DQMs for changing data; a sub-module for computing DQMs for constraints that change over time; a sub-module for computing DQMs for anomalous data regions; a sub-module for performing general case incremental computations of DQMs; a sub-module for managing state for incremental DQM computations; and a sub-module for efficiently prioritizing DQM computations.

In embodiments of the invention, the sub-module for computing DQMs for changing data is configured to track changes in data quality that occur over time while also detecting changes in DQMs over multiple time windows. For example, where the DQM is a measure of missing values in a data set (e.g., a data-frame in the Python programming language), the detected changes in the DQM can include missing values that occur over an entire predetermined time interval (or time window); missing values that occurred most recently; and a weighting applied to missing values such that missing values from more recent data points are weighted more heavily. As another example, a DQM (data quality metric) d1 represents a number of possible data quality checks including missing data, finding low-variance variables, averages, standard deviations, medians, checks for constant values, non-repeating values, repeating values, most occurring values, duplicate values across columns, duplicate rows, and the like. In embodiments of the invention, these data quality checks can not only be applied monolithically across all of the incoming new/updated data values but can also be applied to certain time intervals or time windows of the new/updated data. Accordingly, in embodiments of the invention, d1 results from data quality checks defined or applied across specific windows of a data set. In some embodiments of the invention, d1 can be applied during a time interval/window that extends from a start_time to an end_time. In some embodiments of the invention, d1 can be applied to each batch of new/updated data to arrive at d1(batch1), which is computed for each batch of new/updated data. The values of d1(batch1) through d1(batch–N) can be plotted with d1(batch1) through d1(batch–N) on the y-axis and time values on the x-axis. In some embodiments of the invention, data points falling in different time intervals/windows can be given different weights for calculating DQMs. In some embodiments of the invention, the more recent data points (e.g., within a predetermined time interval/window defined as a recent time interval/window) can be assigned higher weights than less recent data points (e.g., within a predetermined time interval/window defined as a less recent time interval/window) for assessing DQMs. In embodiments of the invention, a number of suitable weighting techniques can be used, including but not limited to exponential weighting (including, but not limited to, exponentially weighted moving averages). In some embodiments of the invention, each data point can be assigned a different weight based on its time. In some embodiments of the invention, data points are grouped by time intervals/windows and the same weight can be assigned to a set of data points belonging to the same group. In some embodiments of the invention, older data points can be ignored entirely in the DQM computations. In some embodiments of the invention, a wide variety of known data quality analysis algorithms can be applied to assist with determining the older data points that will be ignored in the DQM computations. Accordingly, as described above, embodiments of the invention provide new and non-static DQMs that are parameterized by time. The DQA system operating in accordance with aspects of the invention is configured and arranged to compute and visualize the new and non-static DQMs over any range of data points.

In embodiments of the invention, the sub-module for computing DQMs for changing constraints is configured to compute DQMs that measure how well data points satisfy a particular constraint of the DCA system. Because such "constraint" (or constrained) DQMs can change over time, instead of computing one constraint DQM for an entire data set, embodiments of the invention compute a constraint DQM for new/updated data points as they come into the DCA pipeline. In embodiments of the invention, analyzing constraint DQMs that change over time enables more complete data quality analyses of data sets. Examples of constraints include null values not exceeding a threshold; averages (e.g., standard deviation, variance, median, and the like) falling within a certain range; two columns of a data-frame having a certain mathematical relationship or correlation; and the like. Embodiments of the invention recognize and leverage the observation that, with real-time streaming data, the applicability of a given constraint is not a static, fixed property. A constraint that is applicable at one time may or may not be applicable for new data that are being received. Accordingly, embodiments of the invention provide analysis of constraints across multiple different time intervals/windows, and the applicability of a constraint or set of constraints in accordance with aspects of the invention is thus dynamic and expected to vary over time. In some embodiments of the invention, if a constraint DQM is changing significantly (e.g., change levels that exceed a predetermined threshold) over time, information related to the changing constraint DQM can be propagated to a user of the DQA system.

In embodiments of the invention, the sub-module for computing DQMs for anomalous data regions is configured to compute DQMs that measure whether or not data points satisfy criteria for determining whether or not a data point qualifies as "anomalous." In embodiments of the invention, a weight can be assigned to DQMs computed for data points identified as anomalous. In some embodiments of the invention, the weight can be less than one (1) but more than zero (0) based on a computed severity level of the anomaly (e.g., mildly anomalous data can be weighted within about 20% of one (1)). In some embodiments of the invention, anomalous data having a computed severity level over a threshold can be identified as highly anomalous and assigned a weight of zero (0) (i.e., the anomalous data point is ignored when computing DQMs for anomalous data regions).

As an example, in embodiments of the invention where the DQA system uses the Python programming language, a "related" function can be defined as related(feature1, feature2, start_time, end_time). This function returns a value between one (1) and negative one (−1), which indicates a level of correlation between feature1 and feature2 for the time interval/window specified. In embodiments of the invention, the DQA system is configured to maintain related values over several different time intervals. In embodiments of the invention, time intervals/windows are flagged where the related function indicates anomalous behavior in the time interval/window. An example of anomalous behavior for the related function would be the value of related(feature1, feature2, start_time, end_time) changing to values not previously detected by the DQA system. The time intervals/windows where the anomalous data points are flagged at ti and, in accordance with aspects of the invention, data points from the anomalous time interval/window ti can be left out of the DQM computations for ti, or data points from the anomalous time interval/window ti can be assigned a lower weight in computing the DQMs for ti. The DQM can also inform users about anomalous time intervals. Users can provide the DQA system with user-selected preferences about how to treat anomalous time intervals, such as assigning weights to them for computing DQMs.

As another example, in embodiments of the invention, a "missing value" function can be defined in the Python programming language as check_na_columns(df, start_time1, end_time), which checks columns of parameter df for missing values over specific time ranges. In accordance with aspects of the invention, this function can be used to detect the parts of the data should be assigned higher weights in calculating DQMs. For example, if check_na_columns indicates an abnormal proportion of NaN (not a number) values, it may be appropriate to assign less weight to the time interval/window in computing DQMs.

It should be noted that a higher proportion of NaN values does not necessarily mean that a time interval should be assigned a lower weight. In many cases, the DQA system is configured to search for an anomalous number of NaN values, which could indicate an abnormally high or low number of NaN values. If a particular data interval has an unusually low proportion of NaN values compared to other intervals, the DQA system can be configured to interpret this as an indication of an anomaly, which would mean that the interval should be assigned a lower weight than other intervals with a proportion of NaN values that is closer to the mean.

In embodiments of the invention, the sub-module for performing incremental computations of DQMs provides a general case approach to performing incremental computations of DQMs. It is a challenge to make data quality checks incremental in the general case. Embodiments of the invention address and overcome this challenge by providing three types of general case incremental data quality checks, which are defined and identified herein as Type I, Type II, and weighted Type I&II. In embodiments of the invention Type I data quality checks are the data quality checks having corresponding DQMs that can be made incremental in the general case through a decomposition and summation process. For example, where a DQM is defined as q, data coming into the DQA pipeline is organized as data chunks represented as Dw={D1, D2, . . . , Dn} ordered over time, and the quality function is defined as Q(D). The general case incremental data quality check in accordance with aspects of the invention provides a mechanism to decompose the quality function Q by applying Q to each data chunk coming into the DQA pipeline and storing Q({D1, D2, . . . , Dn}) for each data chuck in the data set. When a data chunk Dn+1 of the data set D comes into the DQA pipeline, and the data chunk Dn+1 has new/updated data, Q(D) for the entire data set is D is obtained incrementally by applying Q to the data chunk Dn+1 having new/updated data and combining that result with a summation of the historical results of applying Q to the data chunks {D1, D2, . . . , Dn} in the data set D that have not changed. The summation of the historical Q results is represented by Equation (1) shown in FIG. 13, and the summation of the new/updated Q results with the historical Q results is represented by Equation (2) shown in FIG. 13.

In embodiments of the invention, Type II data quality checks are the data quality checks having corresponding DQMs that can be made incremental in the general case through the decomposition/summation process used in Type I that has been modified to take into account a decomposable operation used in the associated DQM computation. For example, where the quality function Q of the DQM computation is a percentage of NULL values in a dataset D, the percentage computation Q can be decomposed into two functions P and C, where C counts the total data points in the dataset D, and where P is the NULL values in the data set D. Accordingly, Q(D) can be computed as P(D) divided by C(D). In accordance with embodiments of the invention, data coming into the DQA pipeline is organized as data chunks represented as Dw={D1, D2, . . . , Dn} ordered over time, and the quality function is defined as Q(D). The general case incremental data quality check in accordance with aspects of the invention provides a mechanism to decompose the quality function Q by applying P to each data chunk coming into the DQA pipeline; applying C to each data chunk coming into the DQA pipeline; and storing P({D1, D2, . . . , Dn}) and C({D1, D2, . . . , Dn}) for each data chuck in the data set. When a data chunk Dn+1 of the data set D comes into the DQA pipeline, and the data chunk Dn+1 has new/updated data, Q(D) for the entire data set is D is obtained incrementally by applying P to the data chunk Dn+1 having new/updated data; applying C to the data chunk Dn+1; and combining that result with a summation of the historical results of applying P and C to the data chunks {D1, D2, . . . , Dn} in the data set D that have not changed. The summation of the historical P and C results is represented by Equation (3) shown in FIG. 15, and the summation of the new/updated P and C results with the historical P and C results is represented by Equation (4) shown in FIG. 15.

In embodiments of the invention, weighted Type I&II data quality checks are data quality checks where data chunks are weighted under the Type I and II incremental computation scenarios. In some embodiments of the invention, different weights can be applied to different data chunks based on any of the standards for applying weights to data checks previously described herein in connection with aspects of the invention. In some aspects of the invention, a weight w can be selected based on the time elapsed from a last timestamp of a given data chunk to a current time. In some aspects of the invention, uniform of weights can be applied to previous data chunks in a dataset. An example of how weighting can be incorporated into Type I data quality checks in accordance with aspects of the invention is represented by Equation 5 in FIG. 16. An example of how weighting can be incorporated into Type II data quality checks in accordance with aspects of the invention is represented by Equation 6 in FIG. 16.

In embodiments of the invention, the sub-module for managing state for incremental DQM computations provides a mechanism for maintaining state, which is necessary for making incremental DQM computations because incremental computations require a way of keeping track of the previous computations that will be used in the incremental computations. Embodiments of the invention avoid the need to have the DQA system maintain its own database of historical data quality check information by providing the above-described state management sub-module configured and arranged to interface with user systems in a manner that involves exchanging state variable information back and forth between a user system or program and the DQA system. In embodiments of the invention, the DQA system can be implemented in a programming language, such as the Python programming language, and a Python application program interface (API) of the state management sub-module is configured to enable a user program to use the Python API to call various functions related to state management. A wide variety of other programming languages (e.g., Java, C++, C, and others) can also be used for implementing the DQA system. The state management sub-module computes DQMs and passes state information related thereto to the user program. In order to make use of the state information received from the state management sub-module, the user program calls functions of the state management sub-modules that are configured and arranged to actually analyze the state information. Accordingly, the state management sub-module in accordance with aspects of the invention does not require that a user program have the capability of interpreting the format of the state variables. The user program need only use the programming language API (e.g., Python for a Python implementation of the DQA system) to invoke the state management sub-module of the DQA system.

In embodiments of the invention, the sub-module for efficiently prioritizing DQM computations is configured and arranged to efficiently manage the computational resources of the DQM system that are utilized to execute the various non-static and dynamic data quality checks and DQMs described herein. In embodiments of the invention, computer-implemented methods prioritize the execution of DQM computations based on a variety of factors including but not limited to the computational overhead required to compute a DQM; the rate of change for a given DQM; whether previously computed DQMs can be used without a loss in accuracy that exceeds a threshold; and constraint priorities set by a user. In some embodiments of the invention, machine learning models and/or general simulation algorithms can be utilized to predict the impact of DQMs on computational resources, and the DQA system can prioritize execution of DQMs based on the predictions. Example predictions include but are not limited to a prediction of how much a DQM would be expected to change in response to new/updated data; and, for a given data set and data set size, a prediction of the computational overheads for different DQMs performed on the given data set and data size.

Turning now to a more detailed description of embodiments of the invention, FIG. 1 depicts a data quality analysis (DQA) system 100 capable of implementing aspects of the invention. The DQA system 100 is a programmable computer configured and arranged to evaluate data quality in an interactive, automated, and scalable manner to generate human readable reports and produces data pipelines having a sufficient quality level to be reliably consumed by AI/ML systems. The hardware components of the DQA system 100 can be implemented using the features and functionality of the computer system 2700 (shown in FIG. 27). Additionally, a cloud computing system 50 (also shown in FIG. 28) is in wired or wireless electronic communication with the DQA system 100. The cloud computing system 50 can supplement, support or replace some or all of the functionality (in any combination) of the DQA system 100. Additionally, some or all of the functionality of the DQA system 100 can be implemented as a node 10 (shown in FIGS. 28 and 29) of the cloud computing system 50.

The DQA system 100 can be configured to include a validator 110, a remediator 120, a set of constraints 130, a DQA pipeline 140, and an update module 150, configured and arranged as shown. The validator 110 is configured to perform multiple types of data quality checks (pre-defined or customized) on multiple types of data. Examples of the types of data quality checks that can be performed by the validator 110 are listed in FIG. 2. The validator 110 is configured to perform data quality checks on data from different domains and different categories, including general data quality checks that apply to the general properties of any data set, as well as data quality checks that apply to properties that are specific to the specific data formats such as time series data 300 (shown in FIG. 3) and/or DataFrames 400 (shown in FIG. 4).

Figure 3:
FIG. 3 depicts an example of a data-frame that can be analyzed by the DQA system shown in FIG. 1.

The time series data 300 shown in FIG. 3 is an example of how time series data can be represented in the Python programming language. In general, a time series data structure has attributes of a dictionary and a list. Items are stored in order and labeled to facilitate retrieval.

The DataFrame 400 shown in FIG. 4 is an example of how a data-frame can be represented in the Python programming language. In general, a data-frame such as the DataFrame 400 is a two-dimensional data structure in which data is aligned in a tabular fashion in rows and columns. The size of a given data-frame is flexible; rows and columns can be labeled; and arithmetic operations can be performed on rows and columns. The DataFrame 400 also depicts time intervals (or windows), which are ranges of consecutive rows representing a subset of the full data set. The DataFrame 400 is an example of how customer information can be represented in a data-frame, along with examples of data quality issues that can be present in a data-frame, including, for example, the presence of NULL values, default entries, and truncated entries. In embodiments of the invention, multiple data-frames can be streamed into the DQA system 100 for analysis, and the various entries in the data-frame can change over time. For example, in the DataFrame 400, a new customer row can be added or a shipping address of an existing customer row can be changed or updated.

The remediator 120 includes the various types of logic that can be called and used to correct or remediate the data quality issues identified by the validator 110. The constraints 130 are customized rules that a user can select and have applied to customize the way data quality checks performed at the validator(s) 110 interpret the different statistical values obtained from the data. The pipeline 140 uses the validator(s) 110, the remediator 120, and the constraints 130 to automate the data quality analysis operations performed by the validator(s) 110, the remediator 120, and the constraints 130 on a single data set.

Figure 7:
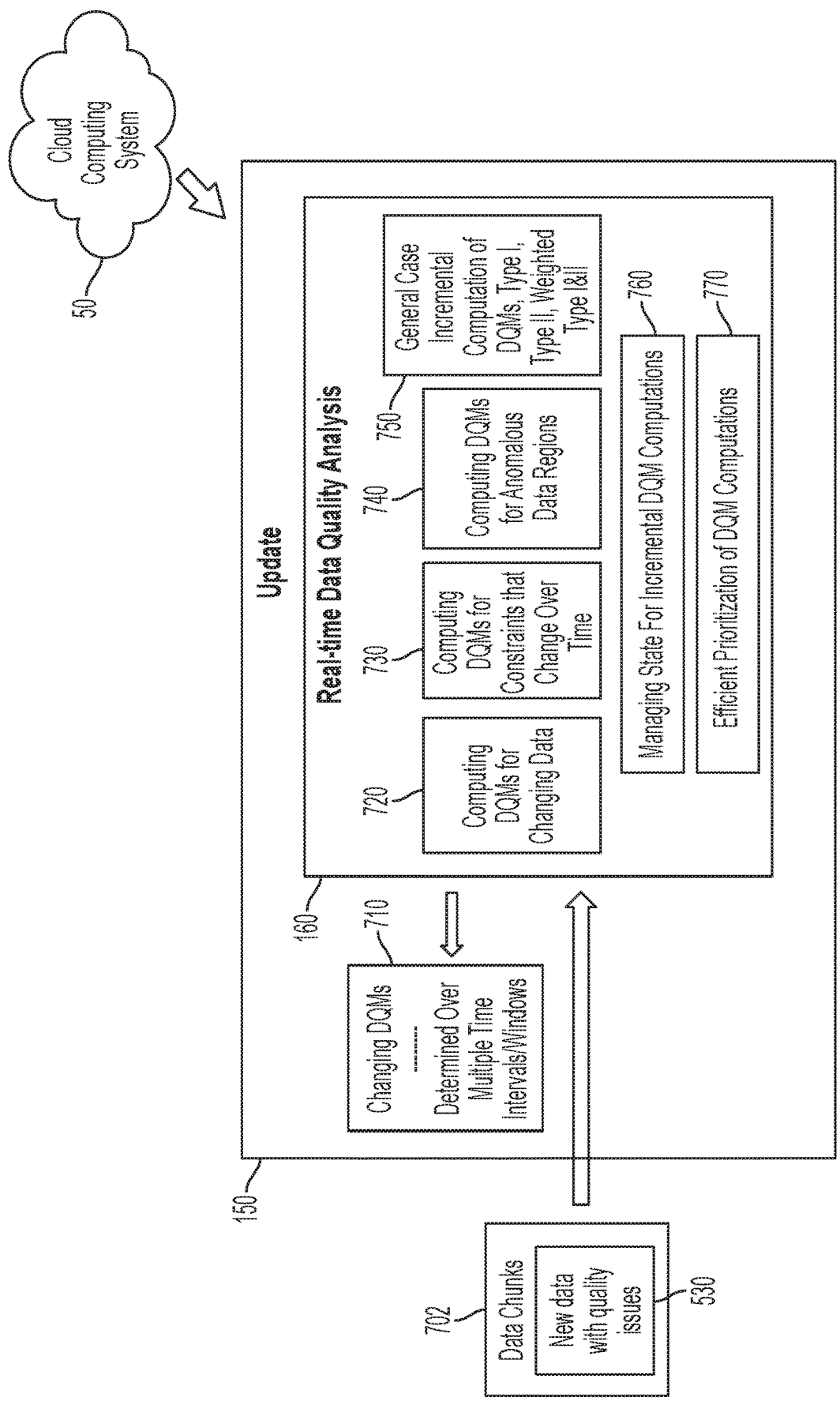
FIG. 7 depicts a block diagram illustrating additional details of how the real-time DQA module of the DQA system shown in FIGS. 1 and 5 can be implemented in accordance with embodiments of the invention.

The update module 150 is configured to update different DQMs after iterations of the data quality analysis processes performed by the DQA system 100. In accordance with embodiments of the invention, the update module 150 includes a real-time data quality analysis (DQA) module 160 configured to implement novel data quality analysis processes in accordance with aspects of the invention. In aspects of the invention, the real-time DQA 160 is configured to perform real-time data quality analysis of changing data by defining multiple non-static and dynamic data quality metrics which are changing over time. Specific details of how the real-time DQA module 160 can be implemented are depicted in FIG. 7 and described in greater detail subsequently herein.

Figure 5:
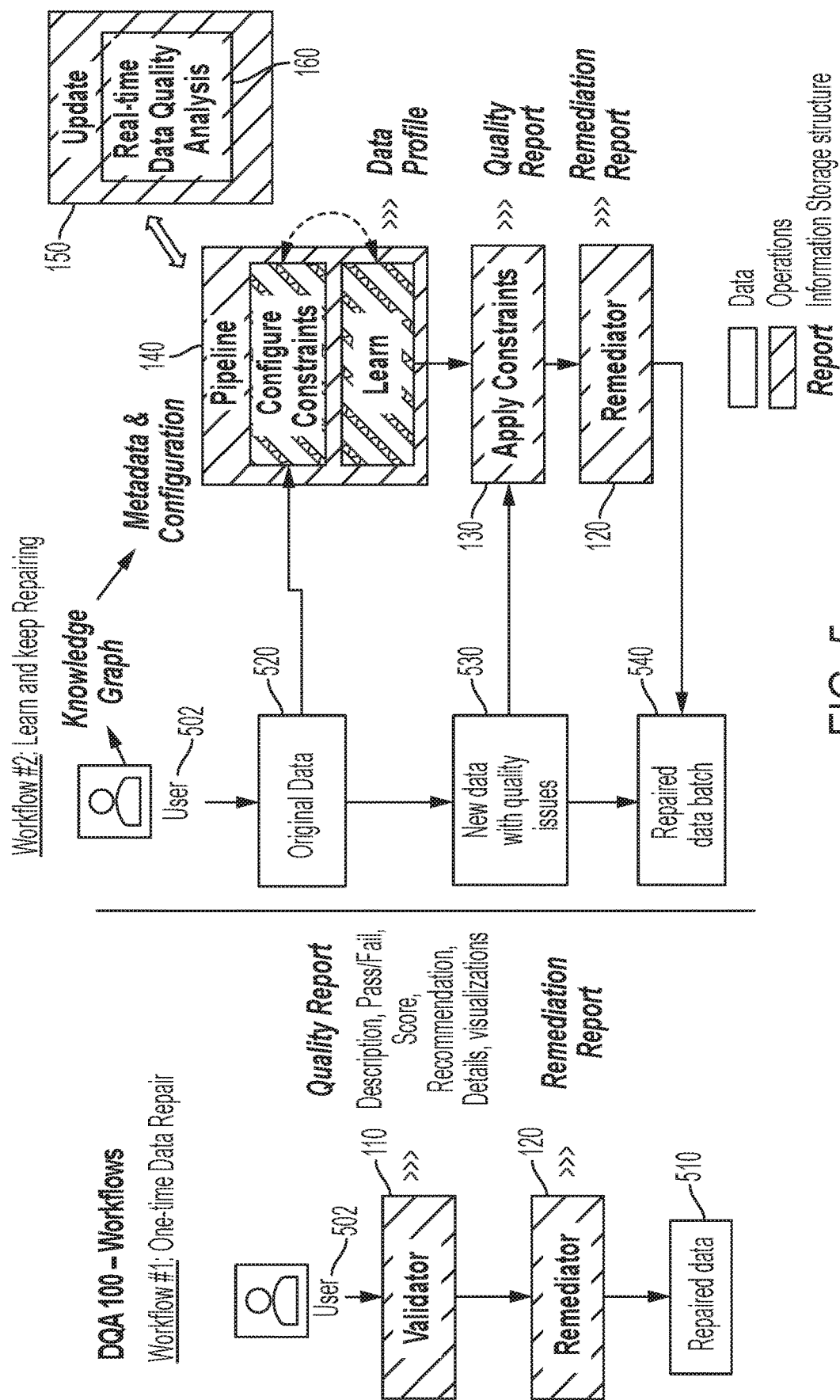
FIG. 5 depicts workflows that can be implemented by the DQA system shown in FIG. 1.
Figure 6:
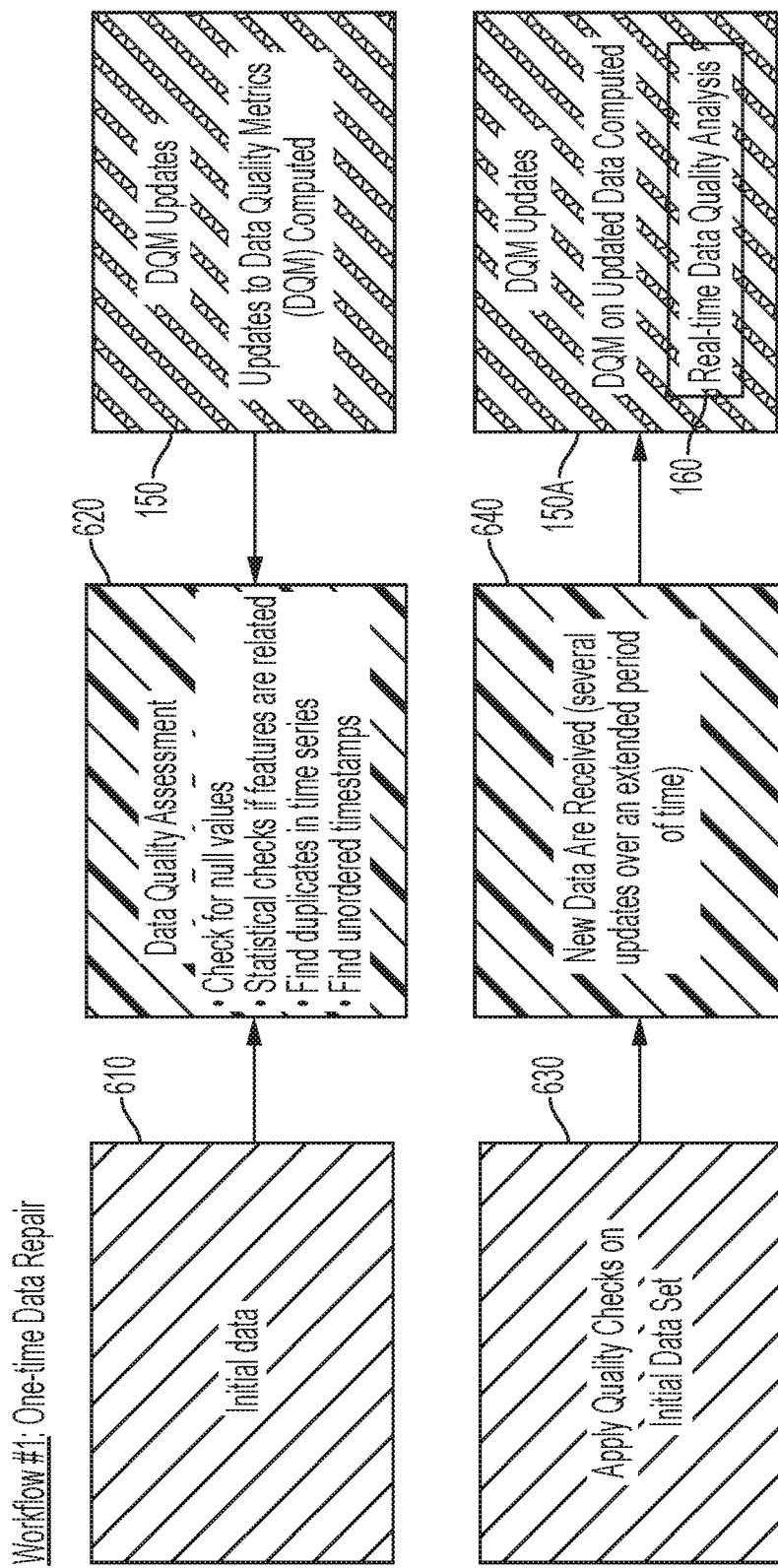
FIG. 6 depicts block diagrams illustrating additional aspects of the workflows shown in FIG. 5.

FIGS. 5 and 6 depict workflows showing how a user 502 interacts with the DQA system 100 under two scenarios. The first scenario is labeled Workflow #1 and depicts how the DQA system 100 executes a one-time data repair when the data set under analysis does not include new or updated data. The second scenario is labeled Workflow #2 and depicts how the DQA system 100 executes a "learn and repair" process when the data set under analysis has been updated to include new/updated data. In FIG. 5, at Workflow #1 the user 502 sets any relevant user inputs (e.g., data format type, user-selectable constraints, and the like), the validator 110 performs data quality checks on the data set under-analysis, the remediator 120 applies the data repairs that are needed in order to address the data quality issues identified by the validator 110, and repaired data 510 is generated. Workflow #1 is also represented diagrammatically in FIG. 6, which illustrates Workflow #1 in three blocks 610, 620, 150A. Block 610 shows an initial data set going into block 620, which performs a data quality assessment (e.g., as performed by the validator 110). The data quality assessments performed at block 620 can include the listed example data quality assessments, as well as the data quality checks shown in FIG. 2. The operations represented by the DQM updates 150 correspond to the operations performed by the updates module 150 shown in FIG. 1, which is configured to update different data quality metrics after iterations of the data quality analysis processes performed by Workflows #1 and #2 of the DQA system 100. As previously noted in connection with the description of the DQA system 100 shown in FIG. 1, the updates module 150 is configured to include a real-time DQA module 160 configured to implement novel data quality analysis processes in accordance with aspects of the invention. In Workflow #1, however, the real-time DQA module 160 is not invoked because the initial data set at block 610 does not include new or changing data.

In FIG. 5, Workflow #2 depicts the user 502 providing access to the original data 520, which is branched into the pipeline 140 for a data quality evaluation while an API (not shown) identifies new data with quality issues 530. In general, the user 502 can specify initial data sets in the API, and the API is configured to provide information to the DQA system 100 identifying portions of the original data 520 that satisfy standards for being an update (i.e., new data) to one of the specified data sets. In this manner, the API is configured to evaluate any new data that is being received to determine whether the new data is an addition or update to a previously received initial data set or an entirely new initial data set. The user 502 also provides a variety of user selections or inputs (e.g., knowledge graphs, metadata, configurations, and the like) to the pipeline 140 for use in the overall data quality analysis process for generating repaired data 540, as well as various cyclic learning and refinement processes ("learn and repair") of the DQA system 100. When the cyclic learn and repair processes are redone, the update module 150 is accessed to provide historical data quality metrics that can be leveraged in the cyclic learn and repair process. The update module 150 further includes the previously-described real-time DQA module 160, which is configured to perform real-time data quality analysis of changing data by defining multiple data quality metrics which are changing over time. Specific details of how the real-time DQA module 160 can be implemented are depicted in FIG. 7 and described in greater detail subsequently herein.

Workflow #2 is also represented diagrammatically in FIG. 6, which illustrates Workflow #2 in three blocks 630, 640, 150A. In block 630, data quality checks are applied on a stream of initial data sets. In block 640, a corresponding stream of new/updated data is identified (e.g., by the API) from the stream of initial data sets. The stream of new/updated data at block 640 includes several updates that are received over an extended period of time. Block 150A is labeled as data quality metric (DQM) updates 150A and corresponds to the features and functionality of the updates module 150 (shown in FIG. 5). In the DQM updates 150A, DQMs are computed incrementally, which means that the DQMs are computed on the new/updated data because it is computationally expensive to re-compute DQMs on the entire initial data set each time it comes up for a data quality evaluation. For example, if the validator 110 needs to apply a missing value check and compute a missing value DQM on the initial data set having new/updated data, instead of computing missing value DQMs for the entire initial data set, the validator 110 is configured to perform an "incremental update" by computing the missing value DQM for the new/updated data and combining it with missing value DQM information that was previously computed for the unchanged portion(s) of the initial data set in the updates module 150. Similar to the update module 150 shown in FIG. 5, the DQM update block 150A includes the previously-described real-time DQA module 160, which is configured to perform various aspects of an incremental update in novel ways. More specifically, the real-time DQA module 160 is configured to perform real-time data quality analysis of changing data by applying multiple DQA methodologies that define multiple data quality metrics which are changing over time.

FIG. 7 depicts details of how the real-time DQA module 160 can be implemented in accordance with embodiments of the invention. As shown in FIG. 7, data chunks 702 with new data with quality issues 530 are provided to the update module 150, which utilizes real-time DQA sub-modules 720, 730, 740, 750, 760, 770 to compute changing DQMs 710 over multiple time windows in accordance with aspects of the invention, as well as efficiently allocate the computer resources required to compute the changing DQMs 710 in accordance with aspects of the invention. Additional details of how the real-time DQA sub-modules 720, 730, 740, 750, 760, 770 can be implemented in accordance with embodiments of the invention are depicted in FIGS. 8-11, 18, 21-23, and 25 and described subsequently herein.

FIG. 7 also depicts the cloud computing system 50 (also shown in FIG. 28) in wired or wireless electronic communication with the update module 150 of the DQA system 100. The cloud computing system 50 can supplement, support or replace some or all of the functionality (in any combination) of the update module 150 of the DQA system 100. Additionally, some or all of the functionality of the DQA system 100 can be implemented as the node 10 (shown in FIGS. 28 and 29) of the cloud computing system 50.

Figure 8:
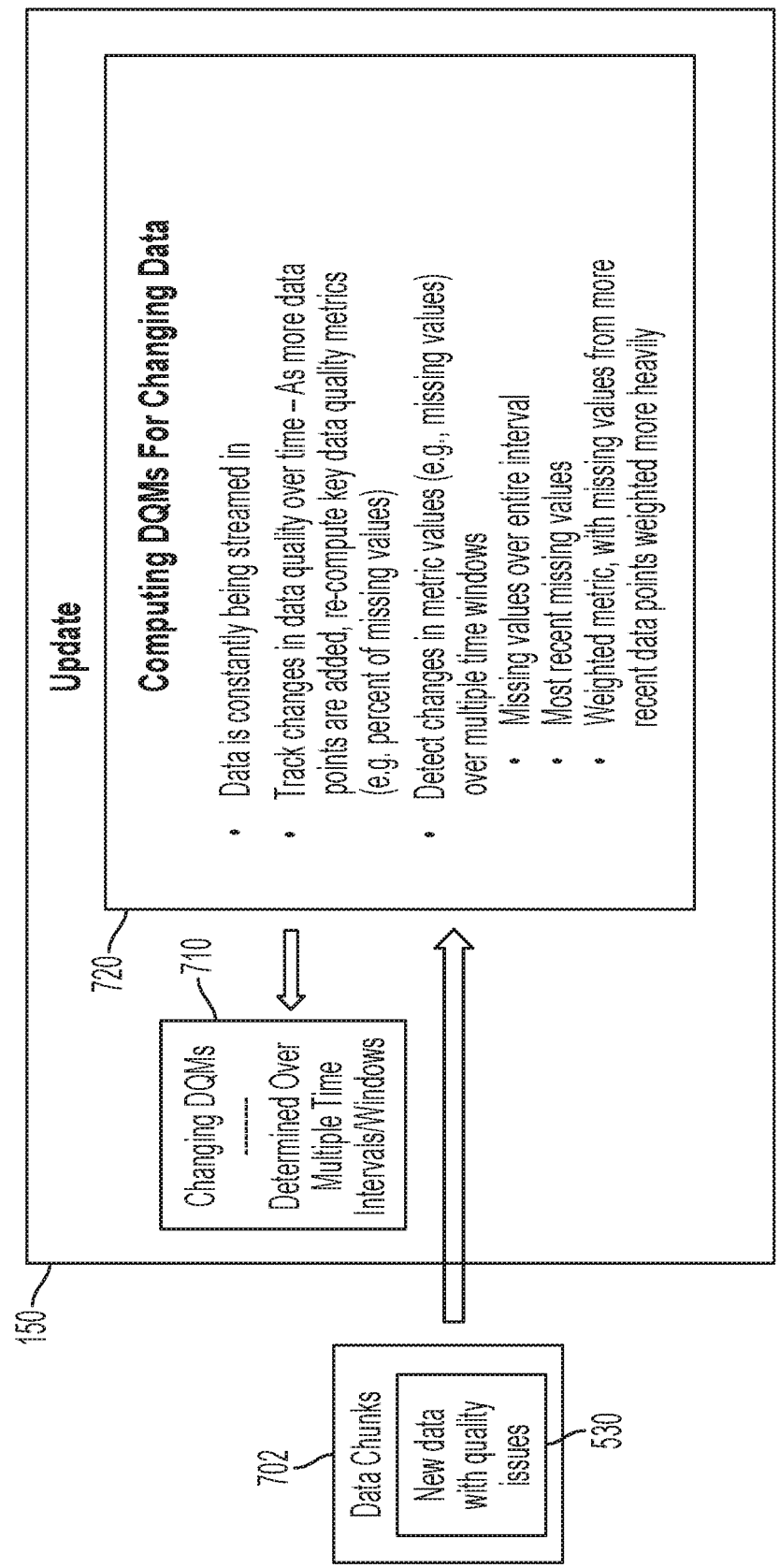
FIG. 8 depicts a block diagram illustrating how a sub-module for computing DQMs for changing data in accordance with aspects of the invention can be implemented by the real-time DQA module shown in FIG. 7.

FIG. 8 depicts a block diagram illustrating details of how the sub-module 720 can be configured and arranged to compute DQMs for changing data in accordance with aspects of the invention. When data chunks 702 and new data with quality issues 530 come into the sub-module 720, the sub-module 720 computes the key DQM values but also tracks changes in the key DQM value over multiple time windows. In this manner, changes in the key DQM values over multiple time windows can be detected. For example, where the key DQM values include a percent of missing values DQM, the sub-module 720 can, in the most general implementation, determine a missing value percentage over an entire interval. In embodiments of the invention, some of the missing value percentages in the interval can be determined to be more important than others in the interval based on one or more criteria. For example, where the most recent missing value percentages are the most important for the relevant applications of the data sets, the sub-module 720 can determine the missing value percentages that occurred most recently (e.g., within a predetermined recent time window). In some embodiments of the invention, the sub-module 720 generates a weighted missing value percentage and assign weights based on a predetermined criterion. For example, in some embodiments of the invention, the predetermined criterion can be missing values percentages from more recent data points are assigned a greater weight value than missing value percentages from less recent data points. Accordingly, the real-time DQM sub-module 720 is configure and arranged to compute DQMs for the changing data itself.

Figure 9:
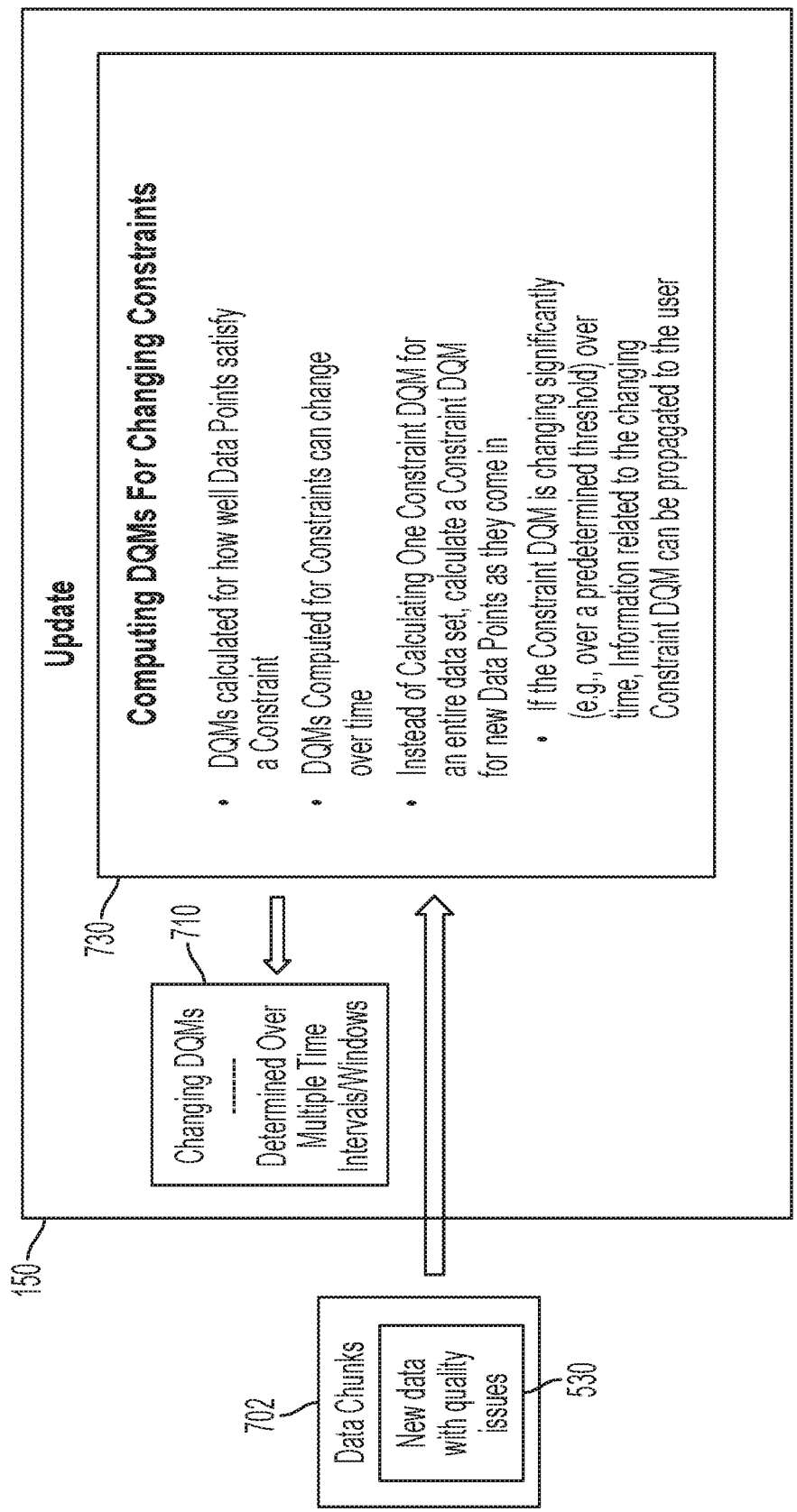
FIG. 9 depicts a block diagram illustrating how a sub-module for computing DQMs for changing constraints in accordance with aspects of the invention can be implemented by the real-time DQA module shown in FIG. 7.

FIG. 9 depicts a block diagram illustrating details of how the sub-module 730 can be configured and arranged to compute DQMs for changing constraints (e.g., constraints 130 shown in FIG. 1) in accordance with aspects of the invention. When new data with quality issues 530 come in, the sub-module 730 computes the DQM values that evaluate how well the data points of the new data with quality issues 530 satisfy constraints. These DQM values can change over time. Instead of computing one constraint DQM for an entire data set, embodiments of the invention compute a constraint DQM for new data points as they come in. If the real-time DQM sub-module 730 determines that the constraint DQM is changing significantly (e.g., above a predetermined threshold) over time, information related to the changing constraint DQM can be propagated to the user. As a non-limiting example, the constraint DQM can be a value that captures how closely a first feature of the data points is related to a second feature of the data points. Other constraint DQMs can be developed and used based on the specific user application under evaluation.

Figure 10A:
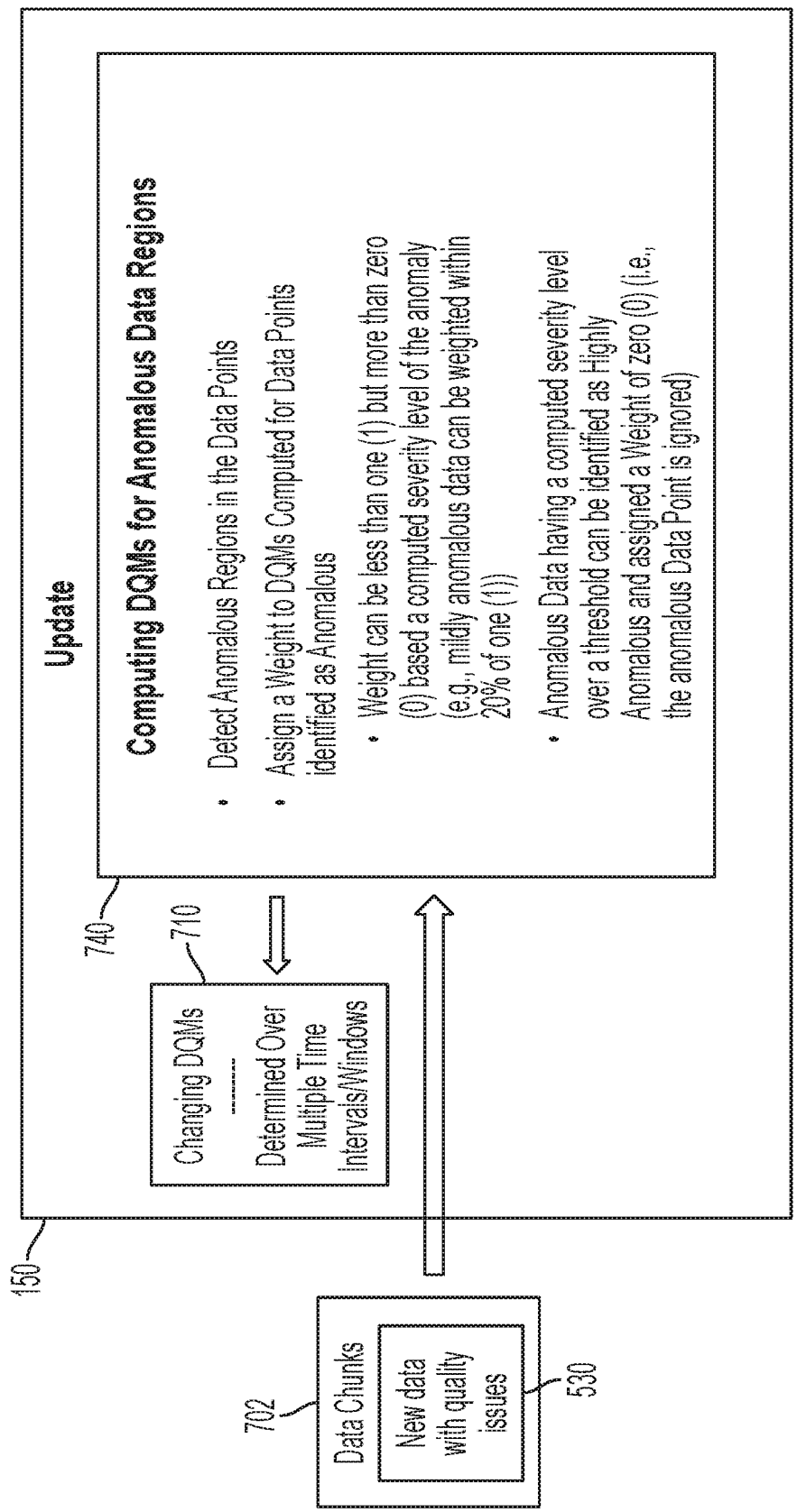
FIG. 10A depicts a block diagram illustrating how a sub-module for computing DQMs for changing anomalous data in accordance with aspects of the invention can be implemented by the real-time DQA module shown in FIG. 7.

FIG. 10A depicts a block diagram illustrating details of how the sub-module 740 can be configured and arranged to make more efficient use of features of the DQA system 100 that identify anomalous regions in data points in order to notify the user of the presence of the anomalous data. In embodiments of the invention, the update module 150 can identify anomalous data by identifying patterns in the data points then detecting that the patterns in the data points have changed over time. For example, data points d1 received between times t2 and t3 can be identified as anomalous because d1 exhibits a different pattern than data points d2 received earlier between times t1 and t2. The real-time DQA sub-module 740 is configured to leverage the anomalous data identification features of the update module 150 by accessing the detected anomalous data points and assigning a weight to DQMs computed for the data points that have been identified as anomalous. In some embodiments of the invention, the real-time DQA sub-module 740 can be configured to assign a weight to the anomalous data point that is less than one (1) but greater than zero (0) based on a computed severity level of the anomaly, using for example a numerical scoring system. For example, the DQMs computer for data points identified by the update module 150 as mildly anomalous can be assigned a weight that is within about 20% of one (1). In some embodiments of the invention, the real-time DQA sub-module 740 can be configured to assign a weight to the anomalous data point that is zero (0), which means that the anomalous data point is ignored in the DQM computations. In some embodiments of the invention, the assignment of a zero (0) weight to anomalous data can be based on the update module 150 identifying highly anomalous based on the numerical scoring system.

In an example implementation of the sub-module 740, a dataset ds1 received between times t3 and t2 is determined by the sub-module 740 to have a higher or lower proportion of null values than a dataset ds2 received previously between times t1 and t2. Either the higher or lower null value proportion can be considered anomalous depending on the patterns that underlay the determination that a dataset is anomalous. A pattern of low null value proportions followed by a high null value proportion can result in a high null value proportion being flagged as anomalous. A pattern of high null value proportions followed by a low null value proportion can result in the low null value proportion being flagged as anomalous. A pattern of low null value proportions followed by another low null value proportion can still result in the most recent null value proportion being flagged as anomalous if the most recent low null value proportion can still be anomalous if it satisfies another standard for being considered anomalous. The sub-module 740 can either assign a lower weight (i.e., between zero (0) and one (1)) or even ignore d1 in computing the DQMs 710 associated with d1 because of an anomalous shift in the null values associated with d1 and d2 over time (from t1 to t3).

Figure 10B:
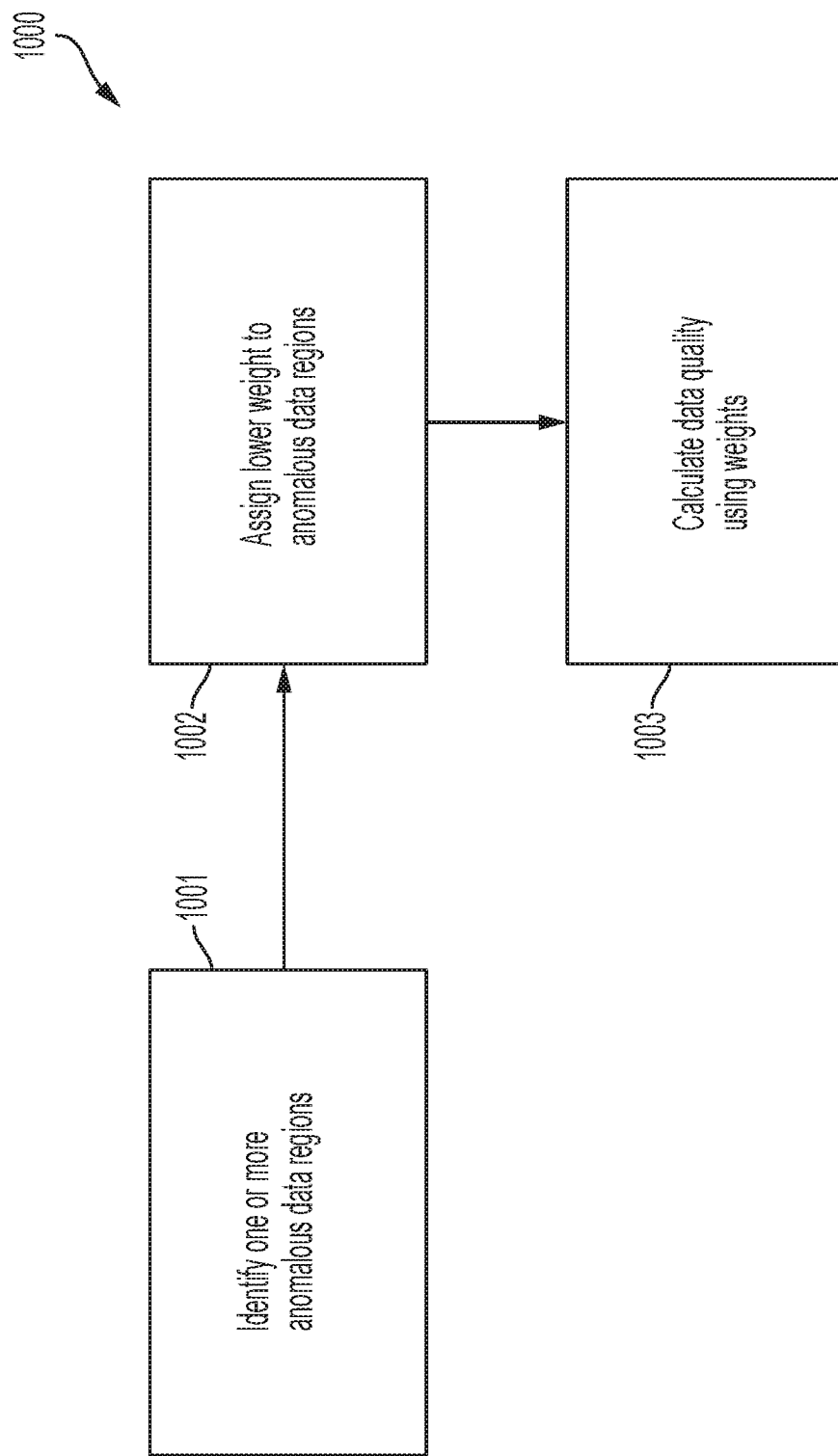
FIG. 10B depicts a flow diagram illustrating a computer-implemented method in accordance with aspects of the invention.

FIG. 10B depicts a flow diagram illustrating a computer-implemented method 1000 that can be implemented by the sub-module 740 (shown in FIG. 10A). In embodiments of the invention, the method 1000 is implemented by the sub-module 740 to compute DQMs over changing data sets when using anomalies. At block 1001, the sub-module 740 identifies one or more anomalous data regions. For example, the anomalous data region can in accordance with aspects of the invention be a data region in which the proportion of null values exceeds a proportion of null values for at least one other data region by a threshold. Alternatively, an anomalous data region can include a data region in which the proportion of null values differs from a proportion of null values for other data by a threshold. A wide variety of other criteria can be used for identifying anomalous data regions. For example, an anomalous data region can correspond to a region where a proportion of data values which are outliers exceeds a threshold. An anomalous data region can also correspond to a region having different statistical properties from other data regions. For example, an anomalous data region can have a mean, median, mode, variance, and/or standard deviation which differs from other data by a threshold.

At block 1002, the sub-module 740 assigns weights to different data regions identified in block 1001. In some embodiments of the invention, block 1002 can assign lower weights to anomalous regions.

At block 1003, the sub-module 740 calculates one or more aggregate data quality metrics using the weights computed at block 1002.

The DQA system 100 in which the sub-module 740 operates can handle different modalities of data. For example, one modality could be time series data (e.g., time series data 300 shown in FIG. 3) while another modality could be tabular data (e.g., DataFrame 400 shown in FIG. 4). In embodiments of the invention, different non-static and dynamic DQMs can be provided for each of these different modalities.

In embodiments of the invention, the non-static and dynamic DQMs can be tailored to the type of analytics tasks associated with the data-under-analysis. For example, classification tasks can have certain DQMs associated with them, while regression or clustering tasks can have other DQMs associated with them. More generally, a user (e.g., user 502 shown in FIG. 5) can utilize the DQA system 100 to perform a specific analytics task, perhaps involving some combination of regression, classification, and clustering. The DQA system 100 in accordance with aspects of the invention can be used by the user to provide specific non-static and dynamic versions of the DQMs suited to such a specific task.

Figure 11:
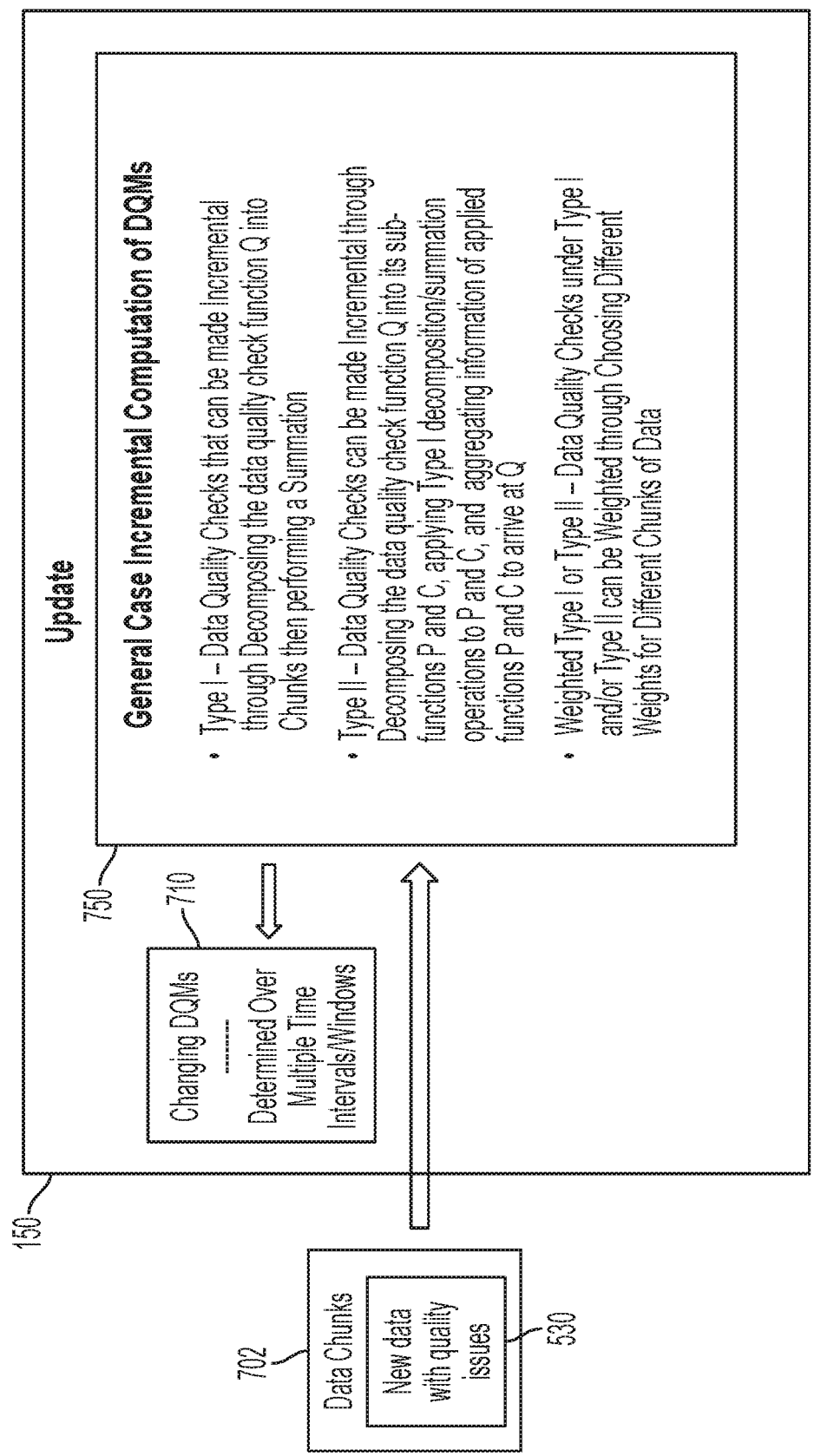
FIG. 11 depicts a block diagram illustrating how a sub-module for performing general case incremental computations of DQMs in accordance with aspects of the invention can be implemented by the real-time DQA module shown in FIG. 7.

FIG. 11 depicts a block diagram illustrating details of how the sub-module 750 can be configured to perform data quality checks "incrementally" on an initial data set by using novel and "general case" methods of computing the changing DQMs 710 incrementally for new/updated data. It is a challenge to make data quality checks incremental in the general case. Embodiments of the invention address and overcome this challenge by providing three types of general case incremental data quality checks, which are defined and identified as Type I, Type II, and weighted Type I&II. In embodiments of the invention, Type I data quality checks are the data quality checks having corresponding DQMs that can be made incremental in the general case through decomposing the data quality checks into chunks then performing a summation process. In embodiments of the invention, Type II data quality checks are the data quality checks that can be made incremental through decomposing the data quality check function (e.g., Q) into its sub-functions (e.g., P and C); applying Type I decomposition/summation operations to each sub-function (e.g., P and C); and aggregating information of applied the sub-functions (e.g., P and C) to arrive at the data quality check (e.g., Q). In embodiments of the invention, weighted Type I and/or weighted Type II data quality checks are the data quality checks performed under Type I or Type II that can be weighted through choosing different weights for different data chunks. FIG. 12 depicts examples of data quality checks that can be performed in the DQA system 100 using Type I and/or Type II general case incremental data quality checks. The example data quality checks shown in FIG. 12 can also be weighted in accordance with weighted Type I and weighted Type II techniques.

Figure 13:
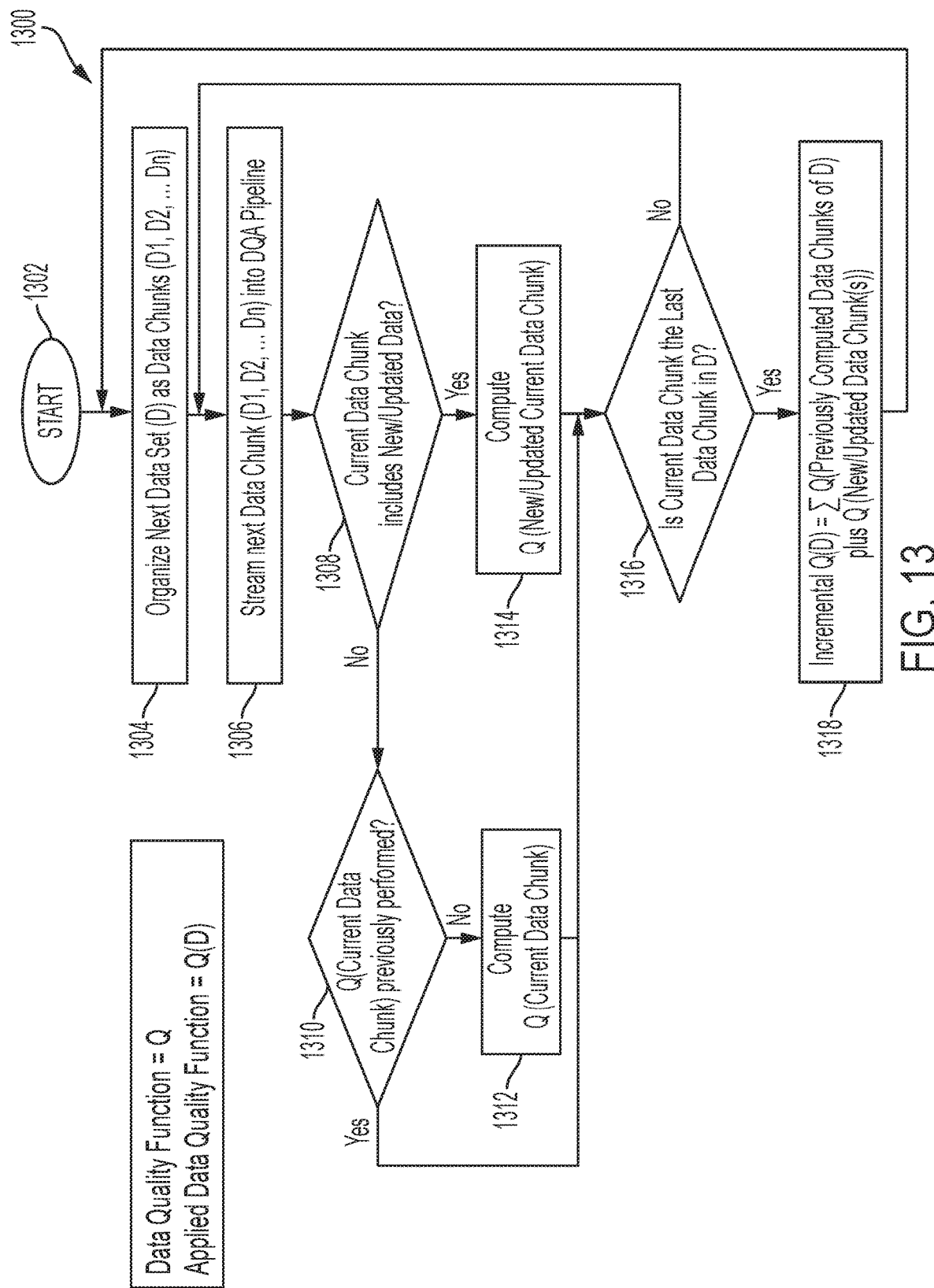
FIG. 13 depicts a flow diagram illustrating a computer-implemented method capable of being executed by the sub-module for performing general case incremental computations of DQMs shown in FIGS. 7 and 11.

FIG. 13 depicts a flow diagram illustrating a method 1300 that is implemented by the sub-module 750 of the update module 150 shown in FIGS. 7 and 11 to perform a Type I general case incremental data quality check in accordance with embodiments of the invention. In the method 1300, the incremental data quality check function is Q, and the data quality check function Q applied to the data set D is Q(D). The method 1300 starts at block 1302 then moves to block 1304 to organize the next data set D as data chunks {D1, D2, . . . , Dn} ordered over time. At block 1306, a next one of the data chunks {D1, D2, . . . , Dn} is streamed into the DQA pipeline 140 (shown in FIGS. 1 and 5) for analysis as a current data chunk. At decision block 1308, an inquiry is made as to whether or not the current data chunk includes new/updated data. If the answer to the inquiry at decision block 1308 is no, the method 1300 move to decision block 1310 to determine whether or not the data quality function Q has been previously applied to the current data chunk. If the answer to the inquiry at decision block 1310 is no, the data quality function Q is applied to the current data chunk at block 1312, and the method 1300 proceeds to decision block 1316. If the answer to the inquiry at decision block 1310 is yes, the method 1300 proceeds to decision block 1316.

Returning to decision block 1308, if the answer to the inquiry at decision block 1308 is yes, the method 1300 proceeds to block 1314, applies the data quality function Q to the new/updated current data chunk, and proceeds to decision block 1316. At decision block 1316, an inquiry is made as to whether or not the current data chunk is the last data chunk in the data set D. If the answer to the inquiry at decision block 1316 is no, the method 1300 returns to block 1306 to process the next data chunk in the data set D. If the answer to the inquiry at decision block 1316 is yes, the method 1300 proceeds to block 1318 and computes the incremental Q(D), which is equal to Σ Q(Previously Computed Data Chunks of D) plus Q (New/Updated Data Chunk(s)). From block 1318, the method 1300 returns to block 1304 to process the next data set.

In accordance with aspects of the invention, block 1318 incrementally applies Q to the entire data set D by applying Q to the data chunk(s) having new/updated data and combining that result with a summation of the historical results of applying Q to the data chunks {D1, D2, . . . , Dn} in the data set D that have not changed. The summation of the historical Q results is represented by Equation (1) shown in FIG. 15, and the summation of the new/updated Q results with the historical Q results is represented by Equation (2) shown in FIG. 15.

Figure 14:
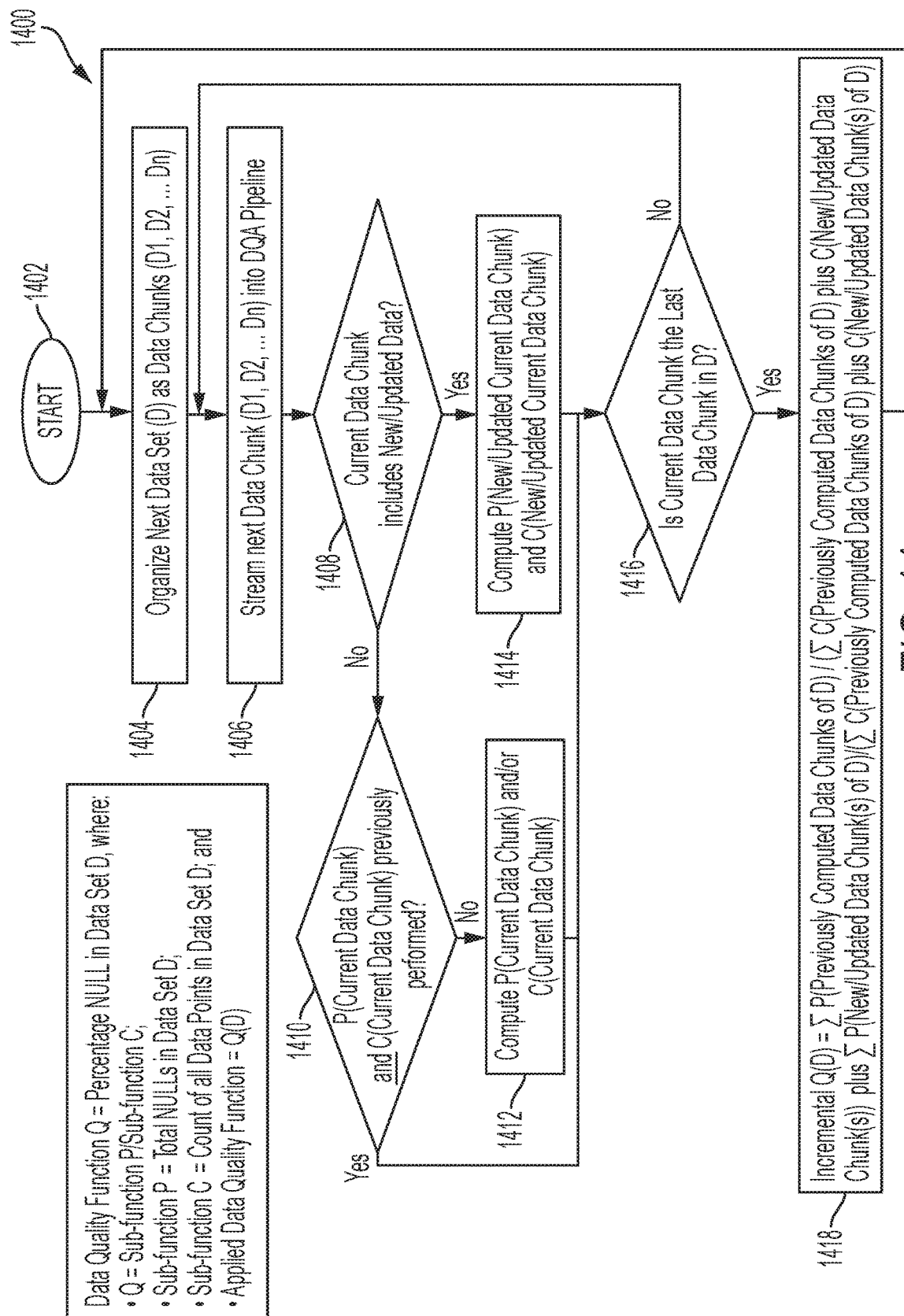
FIG. 14 depicts a flow diagram illustrating a computer-implemented method capable of being executed by the sub-module for performing general case incremental computations of DQMs shown in FIGS. 7 and 11.

FIG. 14 depicts a flow diagram illustrating a method 1400 that is implemented by the sub-module 750 of the update module 150 shown in FIGS. 7 and 11 to perform a Type II general case incremental data quality check in accordance with embodiments of the invention. In the method 1400, the incremental data quality check function is Q, and the data quality check function Q applied to the data set D is Q(D). In the example depicted in FIG. 14, the data quality function Q is a percentage of NULL values in the data set D; Q is equal to a sub-function P divided by a sub-function C; sub-function P is the total NULLs in the data set D; and sub-function C is a count of all data points in the data set D. The method 1400 starts at block 1402 then moves to block 1404 to organize the next data set D as data chunks {D1, D2, . . . , Dn} ordered over time. At block 1406, a next one of the data chunks {D1, D2, . . . , Dn} is streamed into the DQA pipeline 140 (shown in FIGS. 1 and 5) for analysis as a current data chunk. At decision block 1408, an inquiry is made as to whether or not the current data chunk includes new/updated data. If the answer to the inquiry at decision block 1408 is no, the method 1400 move to decision block 1410 to determine whether or not the sub-functions P and C have been previously applied to the current data chunk. If the answer to the inquiry at decision block 1410 is no, the sub-functions P and C are applied to the current data chunk at block 1412, and the method 1400 proceeds to decision block 1416. If the answer to the inquiry at decision block 1410 is yes, the method 1400 proceeds to decision block 1416.

Returning to decision block 1408, if the answer to the inquiry at decision block 1408 is yes, the method 1400 proceeds to block 1414, applies the sub-functions P and C to the new/updated current data chunk then proceeds to decision block 1416. At decision block 1416, an inquiry is made as to whether or not the current data chunk is the last data chunk in the data set D. If the answer to the inquiry at decision block 1416 is no, the method 1400 returns to block 1406 to process the next data chunk in the data set D. If the answer to the inquiry at decision block 1416 is yes, the method 1400 proceeds to block 1418 and computes the incremental Q(D), which is equal to ΣP(Previously Computed Data Chunks of D)/(ΣC(Previously Computed Data Chunks of D) plus C(New/Updated Data Chunk(s)) plus ΣP(New/Updated Data Chunk(s) of D)/(ΣC(Previously Computed Data Chunks of D) plus C(New/Updated Data Chunk(s) of D). From block 1418, the method 1400 returns to block 1404 to process the next data set.

In accordance with aspects of the invention, block 1418 incrementally applies Q to the entire data set D by using the Type I (method 1300) decomposition/summation process that has been modified to take into account a decomposable operation used in the associated DQM computation. In the example method 1400 where the quality function Q of the DQM computation is a percentage of NULL values in a dataset D, the percentage computation Q can be decomposed into two functions P and C, where C counts the total data points in the dataset D, and where P is the NULL values in the data set D. Accordingly, Q(D) can be computed as P(D) divided by C(D). The general case incremental data quality check in the method 1400 in accordance with aspects of the invention provides a mechanism to decompose the quality function Q by applying P to each data chunk coming into the DQA pipeline; applying C to each data chunk coming into the DQA pipeline; and storing P({D1, D2, . . . , Dn}) and C({D1, D2, . . . , Dn}) for each data chuck in the data set. Q(D) for the entire data set is D is obtained incrementally by applying P to the data chunk having new/updated data; applying C to the data chunk having new/updated data; and combining that result with a summation of the historical results of applying P and C to the data chunks {D1, D2, . . . , Dn} in the data set D that have not changed. The summation of the historical P and C results is represented by Equation (3) shown in FIG. 15, and the summation of the new/updated P and C results with the historical P and C results is represented by Equation (4) shown in FIG. 15. Although the method 1400 is depicted for a particular example where function Q can be represented as a sub-function P divided by sub-function C, the method 1400 is applicable to a variety of different functions as long as the function can be decomposed into sub-functions then recombined.

FIG. 16 depicts equations representing weighted Type I&II data quality checks in accordance with aspects of the invention. In some embodiments of the invention different weights can be applied to different data chunks based on any of the standards for applying weights to data checks previously described herein in connection with aspects of the invention. In some aspects of the invention, a weight w can be selected based on the time elapsed from a last timestamp of a given data chunk to a current time. In some aspects of the invention, uniform of weights can be applied to previous data chunks in a dataset. An example of how weighting can be incorporated into Type I data quality checks in accordance with aspects of the invention is represented by Equation 5 in FIG. 16. An example of how weighting can be incorporated into Type II data quality checks in accordance with aspects of the invention is represented by Equation 6 in FIG. 16.

Figure 17:
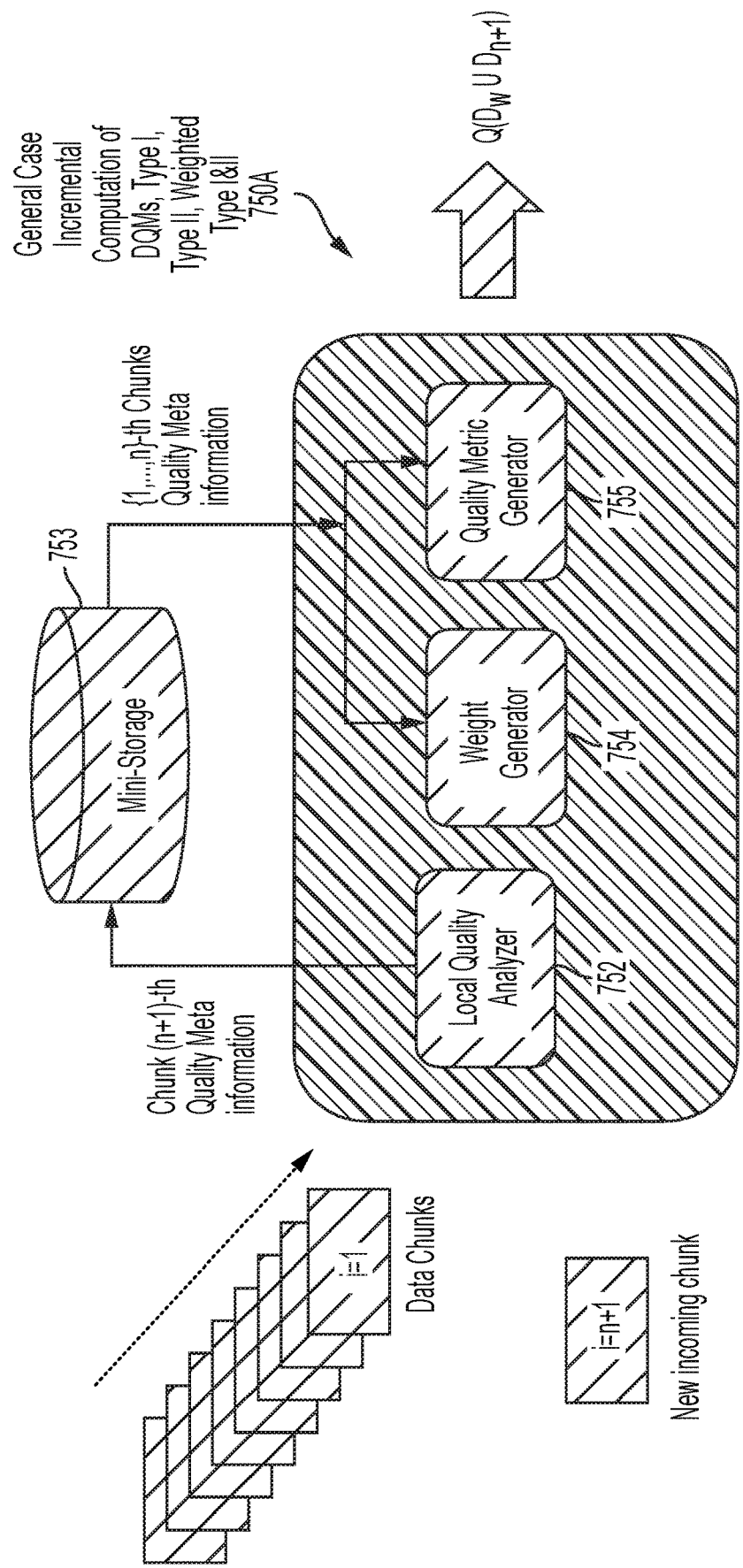
FIG. 17 depicts a computer architecture for implementing the computer-implemented methods and sub-modules shown in FIGS. 7, 11, 13, and 14.

FIG. 17 depicts an architecture of a sub-module 750A, which shows details of how the sub-module 750 (shown in FIGS. 7 and 11) can be implemented in accordance with embodiments of the invention. The sub-module 750A can be utilized to implement the methods 1300 and/or 1400 shown in FIGS. 13 and 14 utilizing the Equations 1-6 shown in FIGS. 15 and 16. As shown in FIG. 17, the sub-module 750A includes a local analyzer 752 configured to perform data quality analysis checks on incoming data chunks and send its results to the mini-storage 753 for subsequent use by the quality metric generator 755 and optionally the weight generator 754 when computing the incremental data quality metric Q(Dw U Dn+1).

Figure 18:
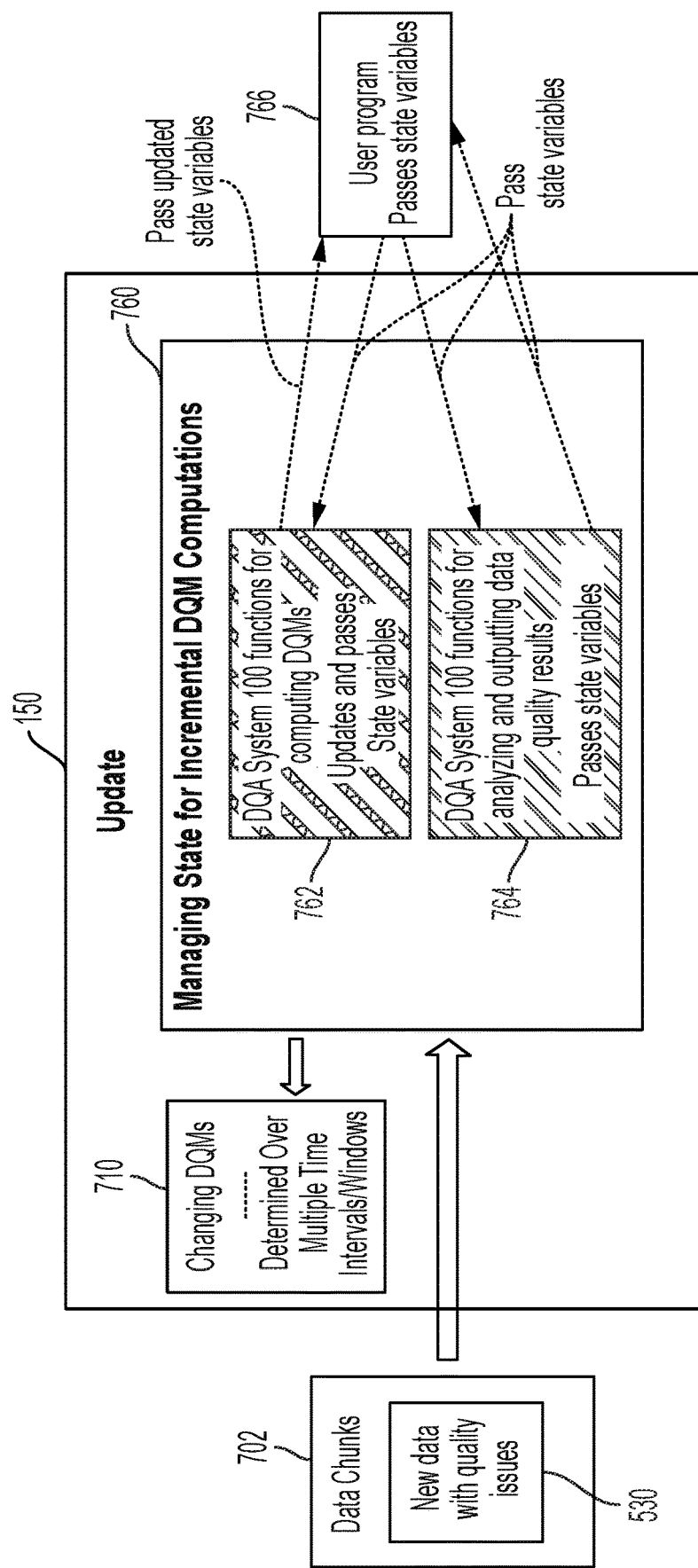
FIG. 18 depicts a block diagram illustrating how a sub-module for managing state for incremental DQM computations in accordance with aspects of the invention can be implemented by the real-time DQA module shown in FIG. 7.

FIG. 18 depicts a block diagram illustrating details of how the sub-module 760 can be configured to manage state for incremental DQM computations in accordance with embodiments of the invention. In embodiments of the invention, the state management sub-module 760 provides a mechanism for maintaining state, which is necessary for making incremental DQM computations because incremental computations require a way of keeping track of the previous computations that will be used in the incremental computations. Embodiments of the invention avoid the need to have the DQA system 100 (shown in FIGS. 1 and 5) maintain its own database of historical data quality check information by providing the sub-module 760A with blocks 762 and 764. Block 762 is configured and arranged to execute functions for computing DQMs, computing DQM updates, and passing state variables back and forth between the sub-module 760 and a user program shown at block 766. Block 764 is configured and arranged to execute functions for analyzing and output data quality results, along with passing state variables back and forth between the sub-module 760 and the user program shown at block 766. In embodiments of the invention, the DQA system 100 is written in the Python programming language, and a Python API of the state management sub-module 760 is configured to enable the user program at block 766 to use the Python API to call various functions related to state management. The state management sub-module 760 at block 762 computes DQMs and passes state information related thereto to the user program at block 766. In order to make use of the state information received from the state management sub-module 760, the user program at block 766 calls functions of the state management sub-module 760 at block 764 that are configured and arranged to actually analyze the data and output the data quality variable. Accordingly, the use of blocks 762, 764 in the state management sub-module 760A in accordance with aspects of the invention does not require that the user program at block 766 have the capability of interpreting the format of the state variables. The user program at block 766 need only use the Python API to invoke the state management sub-module 760.

FIG. 19 depicts an example of how the state management module 760 shown in FIG. 18 can be configured to maintain state information about previous DQM computations. For example, block 762 can compute DQMs for a data region d1. The state information corresponding to these DQMs (e.g., proportion of null values in d1, average, mean, standard deviation for all or part of d1, etc.) is maintained; block 762 computes DQMs for a new region d2. Although in some embodiments of the invention this state information can be maintained in a file system or database of the DQA system 100 (shown in FIGS. 1 and 5), embodiments of the invention also address situations in which it is not feasible to use a file system or database to maintain state information. Accordingly, embodiments of the invention provide blocks 762, 764 configured and arranged to pass the state information (i.e., state variables) between blocks 762, 764 and a client program (shown at block 766) accessing the DQA system 100 through an API thereof. This configuration enables the state management sub-module 760 to generate the state variables and pass them between the DQA system 100 and client programs (i.e., block 766) via the API of the DQA system 100.

In a specific example where the DQA system 100 is implemented in the Python programming language, data regions are passed to the DQA system 100 using Python (e.g. Pandas) dataframes. A DQM implemented as a Python function or method can accept a parameter, interval_info_list, where each element in the list contains information about the data region, such as the relative position of the data region within the entire data set. Other fields corresponding to DQMs for the data region can be included such as proportion of missing values, proportion of infinity values, and proportion of zero values.

For example, a Python function (or method) to check for null values in a data set incrementally can be implemented in the following way. The function updates the null value metrics as new data regions are received. The function can have the following signature: check_na_columns_incremental(df, offset, interval_info_list), where df is the data-frame containing data for the data region; offset represents the relative position of the data region in the entire data set; and interval_info_list includes results from analyses of previous data regions. Accordingly, the function check_na_columns_incremental analyzes df, appends the results to interval_info_list, and returns the updated value of interval_info_list.

In embodiments of the invention, user programs (which can also be referred to as client programs) 766 do not have to deal with the internal structure of interval_info_list variables. User programs 766 can simply pass interval_info_list variables to the DQA system 100 via the API and rely on the DQA system 100 to interpret the interval_info_list variables.

FIG. 20 depicts an example of how, in some embodiments of the invention, the DQA system 100 provides methods to analyze DQMs over time from the state information maintained in the interval_info_list parameters. A function or method to accomplish this is analyze_data_by_interval(interval_info_list), which provides several types of analyses including analysis of DQMs over a single data region, as well as DQMs aggregated across multiple data regions. This function/method can detect trends and anomalies across different data regions. It can also plot data quality metrics corresponding to different data regions, as well as across different time intervals. It can also assign different weights to different data regions when computing aggregate DQMs. In some embodiments of the invention, more recent data can be assigned higher weights than less recent data. In some embodiments of the invention, assigning different weights to different regions when computing aggregate DQMs can be achieved through the use of exponentially weighted moving averages.

FIGS. 21-26 depict details of how the sub-module 770 for efficient prioritization of DQM computations can be implemented in accordance with embodiments of the invention. Because achieving the most accurate and up-to-date DQMs at all times can have prohibitive overhead costs, the sub-module 770 is configured and arranged to make well-reasoned trade-offs between providing reasonable data quality estimates and not using an excessive amount of computational resources, particularly for large data sets. Well-reasoned choices can be made in both the frequency for recalculating DQMs and selecting the most appropriate DQMs to recalculate. Factors that generally increase the potential for excessive computational resources include the size of the data sets, as well as the number of DQMs users need to track.

In embodiments of the invention, the sub-module 770 is configured and arranged to maintain information on performance of different DQMs as a function of data size and possibly other characteristics of the data. The sub-module 770 is configured to maintain historical data on the performance of DQMs. As new data sets are analyzed, the sub-module 770 is configured to maintain persistent information on performance and other execution characteristics in a history recorder (HR) (e.g., history recorder 771 shown in FIG. 21). The sub-module 770 can analyze the HR to better assess the performance of DQM computations performed by the sub-module 770. The HR maintains information on execution of DQMs. When a DQM function is executed, the HR records information, such as data quality function name and parameters; sizes/dimensions of data sets being analyzed; CPU time consumed by function execution; wall clock time consumed by function execution; I/O and/or network overhead if significant; and hardware and software used to execute the function. For tabular data (e.g., DataFrame 400 shown in FIG. 4), the HR maintains information such as number of rows, number of columns, as well as information on data types of columns (e.g. numerical, string, categorical, etc.). The HR allows the sub-module 770 to create performance profiles (e.g., DQM performance profiles 772 shown in FIG. 21) for all of the DQMs of interest. For a given data set and data set size, the sub-module 770 can thus estimate the overheads for different DQMs performed on that data set. The sub-module 770 is further configured to maintain information on how DQMs change with changes in the data itself. The sub-module 770 is configured to use this information to predict how much DQMs would be expected to change in response to new data. Such change predictions can be made using simple calculations (e.g., simulation algorithms 775 shown in FIG. 21) or more complex machine learning models (e.g., machine learning algorithms and models 774 shown in FIG. 21).

Figure 21:
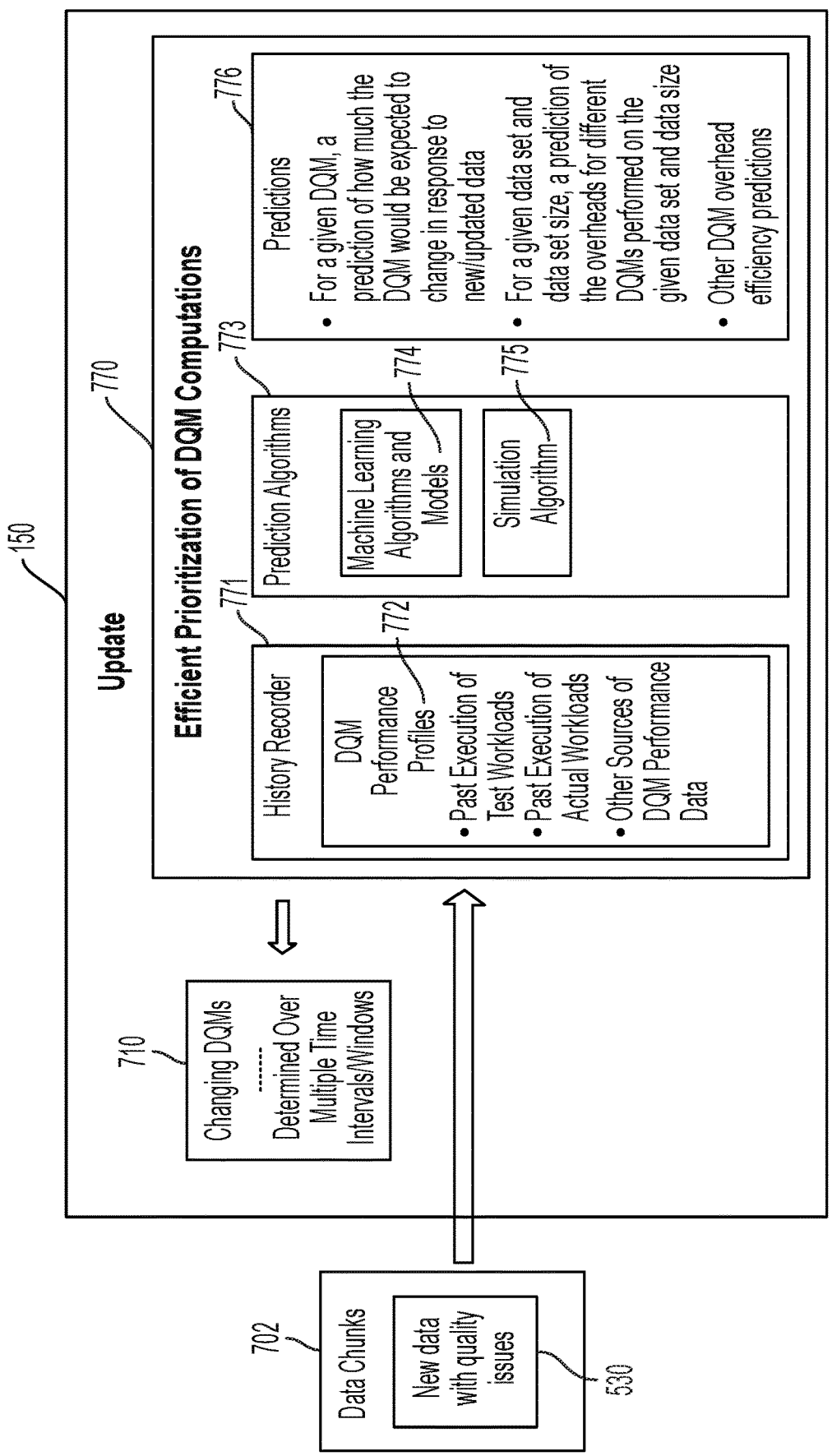
FIG. 21 depicts a block diagram illustrating an example of how a sub-module for efficiently prioritizing DQM computations can be implemented in accordance with aspects of the invention in the real-time DQA module of the DQA system shown in FIG. 7.

FIG. 21 depicts a block diagram illustrating a functional architecture for how the sub-module 770 can be implemented in accordance with embodiments of the invention to efficiently prioritize DQM computations to thereby efficiently manage the computational resources of the DQM system 100 that are utilized to execute the various non-static and dynamic data quality checks and DQMs described herein. The architecture of the sub-module 770 includes a history recorder 771 and one or more prediction algorithms 773 configured to generate predictions 776. In embodiments of the invention, the history recorder 771 include DQM performance profiles 772, each of which can include past execution of test workloads; past execution of actual workloads; and other source of DQM performance data. The prediction algorithms 773 can include machine learning algorithms and models 774 and/or simulation algorithms 775. The machine learning algorithms and models 774 can be trained to generate a model of the DQM system 100, including the data sets that are analyzed by the DQM system 100, along with computational overhead associated therewith. The simulation algorithms 775 can be configured to model or simulate the performance of the DQA system 100, including the computational resources required to perform a variety of data quality checks and analyses. The prediction algorithms 773 are configured to generate predictions 773, which can include but are not limited to prediction of how much a given DQM would be expected to change in response to new/updated data; for a given data set and data set size, a prediction of the overheads for different DQMs performed on the given data set and data size; and/or other DQM overhead efficiency predictions.

Figure 22:
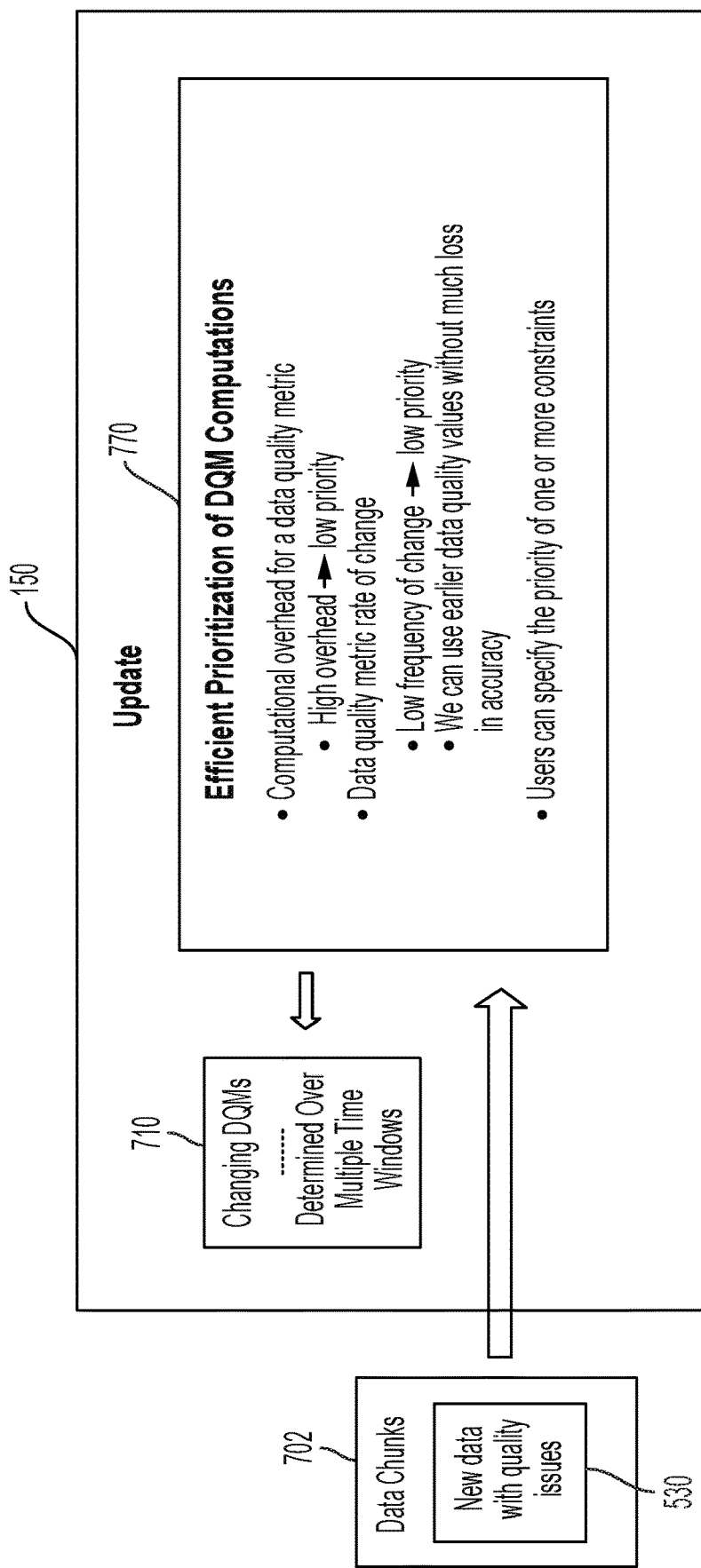
FIG. 22 depicts a block diagram illustrating additional details of how a sub-module for efficiently prioritizing DQM computations can be implemented in accordance with aspects of the invention using the real-time DQA module of the DQA systems shown in FIGS. 7 and/or 19.

FIG. 22 depicts another block diagram illustrating functional features of the sub-module 770 in accordance with embodiments of the invention. In embodiments of the invention, the sub-module 770 is configured to prioritize the execution of DQM computations based on a variety of factors including but not limited to the computational overhead required to compute a DQM; the rate of change for a given DQM; whether previously computed DQMs can be used without a loss in accuracy that exceeds a threshold; and constraint priorities set by a user. In embodiments of the invention, the sub-module 770 is configured to focus its analysis on selected types of constraints including but not limited to constraints most closely associated with important characteristics of the application (user specified, or known from past experience with the application); constraints that are changing most frequently; and computationally inexpensive constraints, which have low overhead to compute and update. In embodiments of the invention, the sub-module 770 is configured to rank constraints using these characteristics such that higher ranked constraints are evaluated more frequently.

Figure 23:
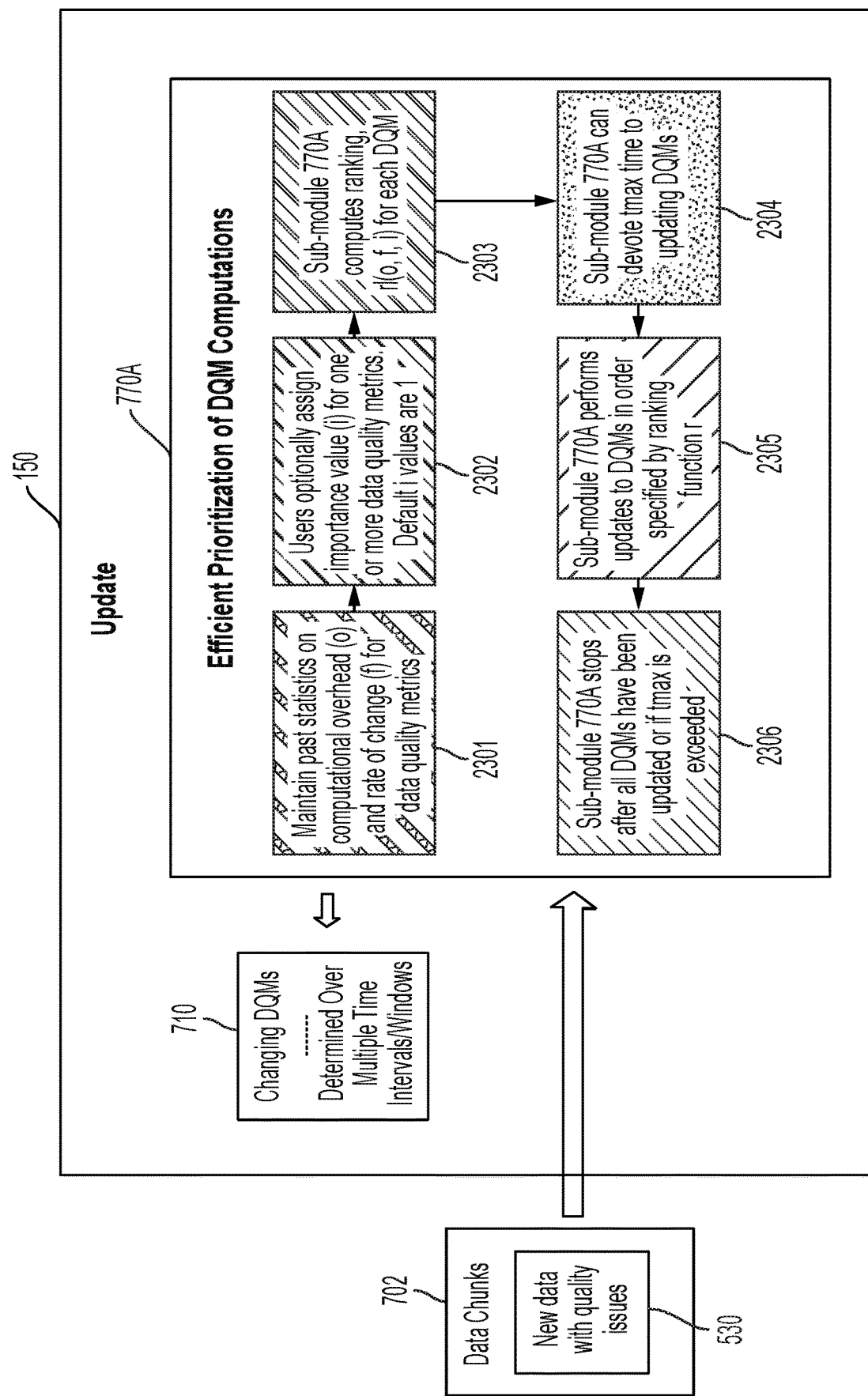
FIG. 23 depicts a block diagram illustrating how computer-implemented methods can be executed by the sub-module for efficiently prioritizing DQM computations in accordance with aspects of the invention using the real-time DQA module of the DQA system shown in FIGS. 7 and/or 19.

FIG. 23 depicts a block diagram illustrating detail of an algorithm implemented by a sub-module 770A in accordance with embodiments of the invention, and FIG. 24 depicts aspects of the algorithm implemented by the sub-module 770A. Accordingly, the following description of the sub-module 770 shown in FIG. 23 also references items depicted in FIG. 24. In accordance with aspects of the invention, the sub-module 770A includes all the features and functionality of the sub-modules 770 previously described herein with the added functionality of the algorithm depicted in sub-module 770A. In embodiments of the invention, the algorithm of the sub-module 770A is configured to efficiently prioritize DQM computations and thereby efficiently manage the computational resources of the DQM system 100 that are utilized to execute the various non-static and dynamic data quality checks and DQMs described herein. The algorithm of the sub-module 770A begins at block 2301 where the DQA system 100 maintains past statistics on computational overhead, o, and rate of change, f, for different DQMs. The variable f represents the magnitude with which a DQM changes as new data are received. Block 2301 is continuously executing over time. In block 2302, a user (e.g., user 502 shown in FIG. 5) optionally assign an importance value, i, for one or more metrics. Default i values are one (1) for situations in which users do not provide an importance value. At block 2303, the sub-module 770A computes ranking $r(o, f, i)$ for each DQM. In embodiments of the invention, a variety of different functions can be used for r. In an example, a rating is assigned using a function of rating=$a*o+b*f+c*i$, where a is a negative constant; b is a positive constant; c is a positive constant; o is overhead for computing the DQM; f is the rate of change of the DQM as new data are received; i is the importance of the DQM provided by the user; and a default value of one (1) is used if no user value is selected. The ranking function r orders DQMs in decreasing order by ratings. At block 2304, the sub-module 770A can devote tmax time to updating DQMs. At block 2305, the sub-module 770A performs updates to DQMs in an order specified by ranking function r. At block 2306, the sub-module 770A stops performing updates to DQMs after all DQMs have been updated or if tmax is exceeded.

Figure 25:
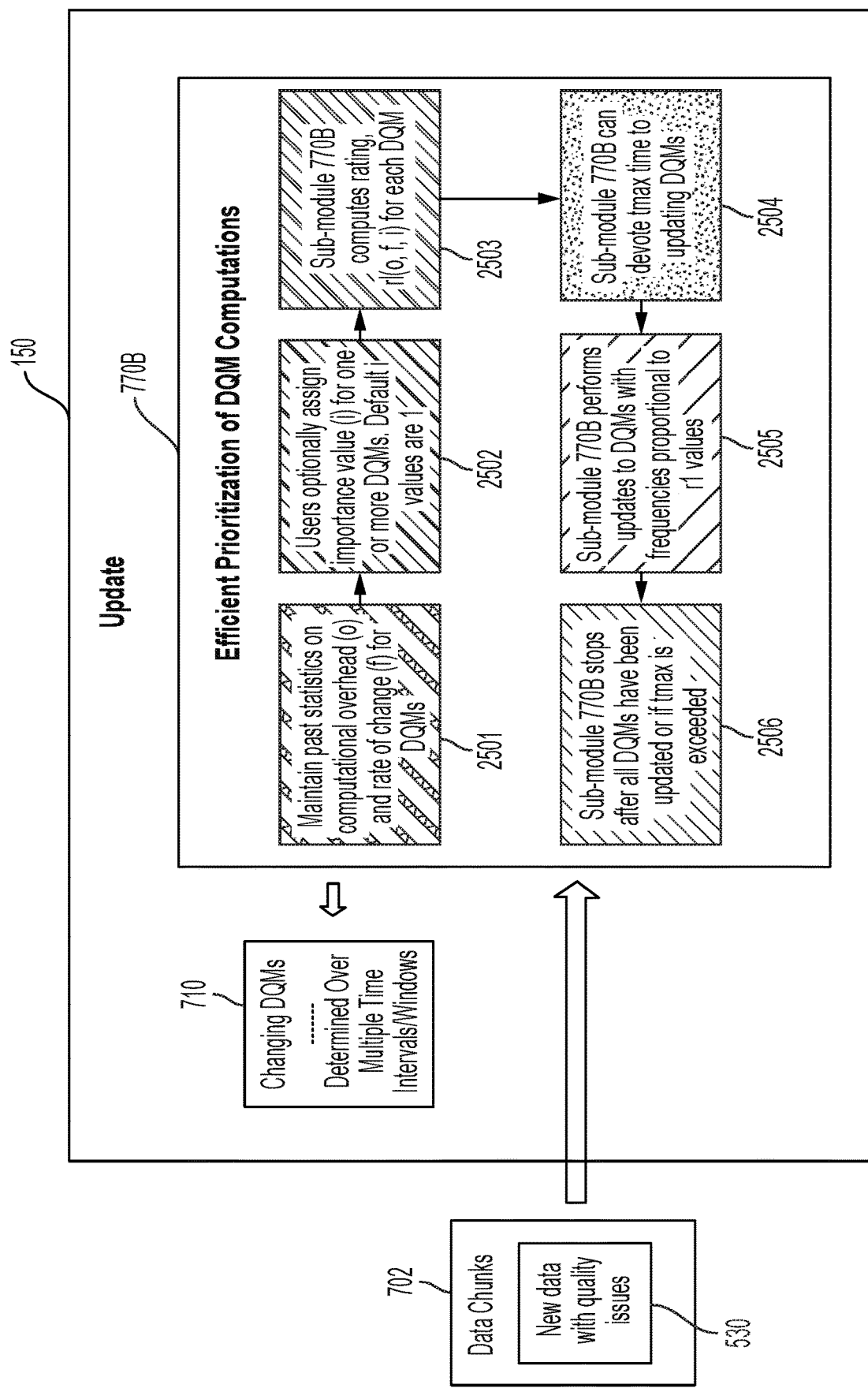
FIG. 25 depicts a block diagram illustrating how computer-implemented methods can be executed by the sub-module for efficiently prioritizing DQM computations in accordance with aspects of the invention using the real-time DQA module of the DQA system shown in FIG. 7 and/or the architecture shown in FIG. 19.

FIG. 25 depicts a block diagram illustrating detail of an algorithm implemented by a sub-module 770B in accordance with embodiments of the invention, and FIG. 26 depicts aspects of the algorithm implemented by the sub-module 770B shown in FIG. 25. Accordingly, the following description of the sub-module 770B shown in FIG. 25 also references items depicted in FIG. 26. In accordance with aspects of the invention, the sub-module 770B includes all the features and functionality of the sub-modules 770 previously described herein with the added functionality of the algorithm depicted in sub-module 770B. In embodiments of the invention, the algorithm of the sub-module 770B is configured to efficiently prioritize DQM computations and thereby efficiently manage the computational resources of the DQM system 100 that are utilized to execute the various non-static and dynamic data quality checks and DQMs described herein. In accordance with aspects of the invention, the algorithm of the sub-module 770B avoids the problem that, if the DQA system 100 always runs out of time to compute DQMs (i.e. tmax is always exceeded), low-ranked DQMs might never be updated.

The algorithm of the sub-module 770B begins at block 2501 where the sub-module 770B maintains past statistics on computational overhead, o, and rate of change, f, for different DQMs. The variable f represents the magnitude with which a DQM changes as new data are received. Block 2501 is continuously executed over time. At block 2502, a user (e.g., user 502 shown in FIG. 5) optionally assigns an importance value, i, for one or more metrics. Default i values are one (1) for situations in which users do not provide an importance value. The sub-module 770B computes a rating $r1(o, f, i)$ for each DQM in block 2503. In embodiments of the invention, a variety of different functions can be used for r1. In an example, a rating is assigned using a function $r1=a*o+b*f+c*i$ where a is a negative constant; be is a positive constant, c is a positive constant; o is overhead for computing the DQM; f is the rate of change of the DQM as new data are received; i is the importance of the DQM provided by the user; and a default value of one (1) is used if no user selection is provided. The vales for r1 represent relative frequencies for which the sub-module 770 should update a DQM. All r1 values should be positive. In order to ensure that all DQMs are computed at least some of the time, even if tmax is always exceeded, the ratio between highest and lowest values is selected to not exceed a threshold (i.e., should not be too high). At block 2504, the sub-module 770B can devote tmax time to updating DQMs. At block 2505, the sub-system 770B performs updates to DQMs. Each DQM is updated with a frequency proportional to its r1 value. At block 2506, the sub-module 770B stops performing updates to DQMs after all DQMs have been updated or if tmax is exceeded.

Figure 27:
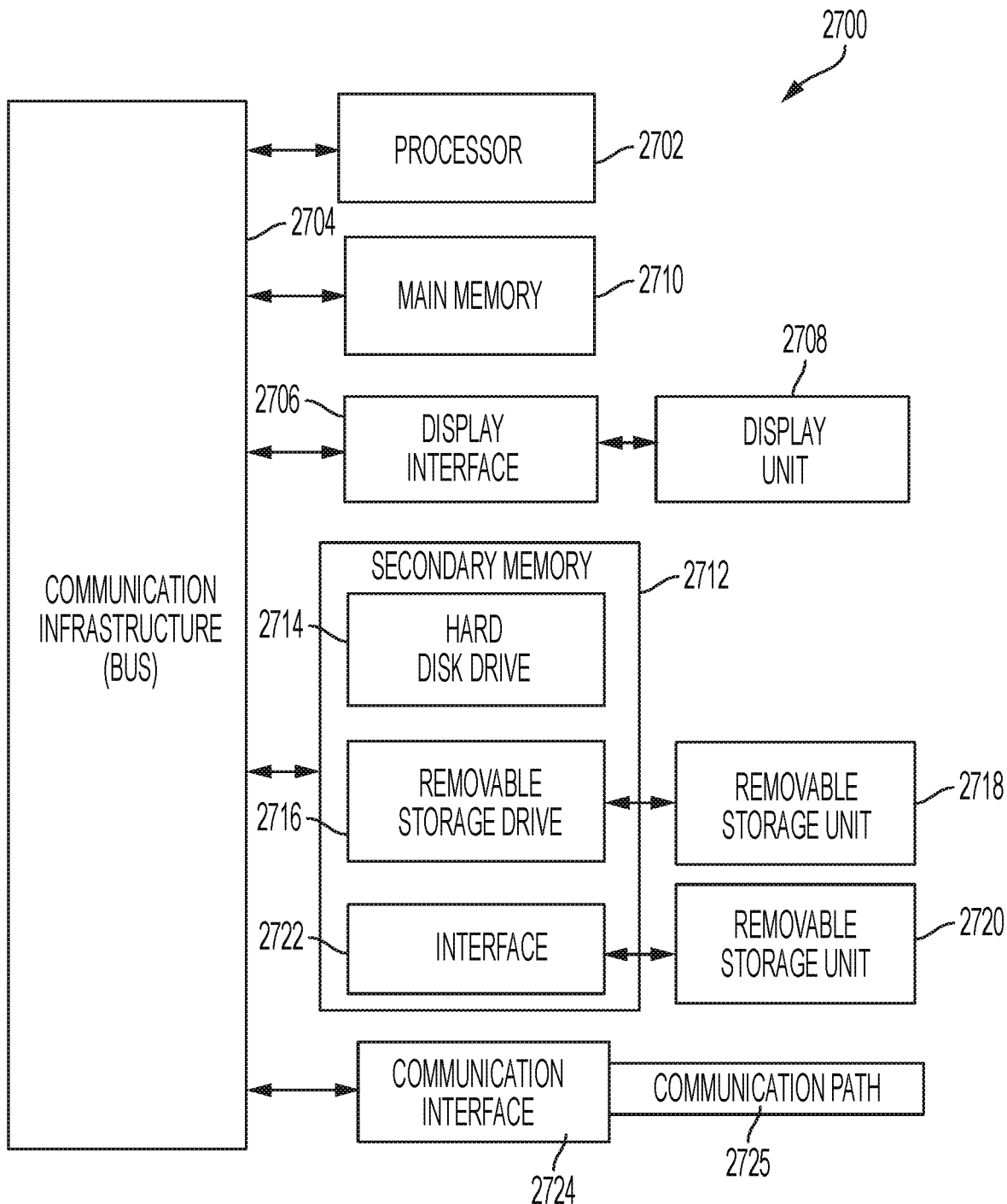
FIG. 27 depicts a block diagram illustrating a computer system capable of implementing aspects of the invention.

FIG. 27 depicts a high level block diagram of the computer system 2700, which can be used to implement one or more computer processing operations in accordance with aspects of the invention. Although one exemplary computer system 2700 is shown, computer system 2700 includes a communication path 2726, which connects computer system 2700 to additional systems (not depicted) and can include one or more wide area networks (WANs) and/or local area networks (LANs) such as the Internet, intranet(s), and/or wireless communication network(s). Computer system 2700 and additional system are in communication via communication path 2726, e.g., to communicate data between them.

Computer system 2700 includes one or more processors, such as processor 2702. Processor 2702 is connected to a communication infrastructure 2704 (e.g., a communications bus, cross-over bar, or network). Computer system 2700 can include a display interface 2706 that forwards graphics, text, and other data from communication infrastructure 2704 (or from a frame buffer not shown) for display on a display unit 2708. Computer system 2700 also includes a main memory 2710, preferably random access memory (RAM), and can also include a secondary memory 2712. Secondary memory 2712 can include, for example, a hard disk drive 2714 and/or a removable storage drive 2716, representing, for example, a floppy disk drive, a magnetic tape drive, or an optical disk drive. Removable storage drive 2716 reads from and/or writes to a removable storage unit 2718 in a manner well known to those having ordinary skill in the art. Removable storage unit 2718 represents, for example, a floppy disk, a compact disc, a magnetic tape, or an optical disk, flash drive, solid state memory, etc. which is read by and written to by removable storage drive 2716. As will be appreciated, removable storage unit 2718 includes a computer readable medium having stored therein computer software and/or data.

In alternative embodiments, secondary memory 2712 can include other similar means for allowing computer programs or other instructions to be loaded into the computer system. Such means can include, for example, a removable storage unit 2720 and an interface 2722. Examples of such means can include a program package and package interface (such as that found in video game devices), a removable memory chip (such as an EPROM, or PROM) and associated socket, and other removable storage units 2720 and interfaces 2722 which allow software and data to be transferred from the removable storage unit 2720 to computer system 2700.

Computer system 2700 can also include a communications interface 2724. Communications interface 2724 allows software and data to be transferred between the computer system and external devices. Examples of communications interface 2724 can include a modem, a network interface (such as an Ethernet card), a communications port, or a PCM-CIA slot and card, etcetera. Software and data transferred via communications interface 2724 are in the form of signals which can be, for example, electronic, electromagnetic, optical, or other signals capable of being received by communications interface 2724. These signals are provided to communications interface 2724 via communication path (i.e., channel) 2726. Communication path 2726 carries signals and can be implemented using wire or cable, fiber optics, a phone line, a cellular phone link, an RF link, and/or other communications channels.

In the present description, the terms "computer program medium," "computer usable medium," "computer program product," and "computer readable medium" are used to generally refer to media such as main memory 2710 and secondary memory 2712, removable storage drive 2716, and a hard disk installed in hard disk drive 2714. Computer programs (also called computer control logic) are stored in main memory 2710 and/or secondary memory 2712. Computer programs can also be received via communications interface 2724. Such computer programs, when run, enable the computer system to perform the features of the invention as discussed herein. In particular, the computer programs, when run, enable processor 2702 to perform the features of the computer system. Accordingly, such computer programs represent controllers of the computer system.

Technical effects and benefits of the disclosed DQA system for performing real-time data quality analysis include but are not limited to the following. Embodiments of the invention provide a DQA system that performs accurate data analytics checks in several problem domains, particularly in applications where new data are constantly being streamed in. The DQA system generate data quality metrics that are constantly updated as new data are received. The DQA system in accordance with aspects of the invention further provide new methods for performing data quality assessment when data are constantly being streamed in.

An additional technical benefit of a DQA system in accordance with aspects of the invention is that it defines multiple metrics which are changing over time. Although the disclosed DQA system provides incremental computations for a number of different data quality metrics, it goes significantly beyond past work in defining new metrics which improve upon existing metrics for static data sets. The disclosed DQA system is configured to, when considering new data which is streaming in, define new metrics which are applicable to constantly changing data rather than just using existing metrics. The disclosed DQA system allows data quality checks to be defined across specific windows of a data set.

An additional technical benefit of a DQA system in accordance with aspects of the invention is that different time periods can be given different weights for calculating data quality metrics. In general, more recent data points can be assigned higher weights than less recent data points for assessing data quality metrics. Each sample or data point can be assigned a different weight based on its time. Samples can be grouped by time intervals and a same weight can be assigned to a set of samples belonging to a same group. In some cases, older values can be ignored entirely. Different algorithms can be applied to determine which older values should be ignored.

An additional technical benefit of the DQA system is that it can provide data quality metrics which are parameterized by time. The metrics can be calculated and visualized over any range of data points.

An additional technical benefit of a DQA system in accordance with aspects of the invention is that it is configured to provide complete analyses of data sets, including constraints which are applicable to a data set. A DQA system in accordance with aspects of the invention leverage an observation that, with real-time streaming data, applicability of constraints is not a static, fixed property. A constraint may be applicable at one particular time, but not for new data which are being received. The disclosed DQA system accordingly is configured to provide analysis of constraints across multiple time scales. The disclosed DQA system thus treats the applicability of a constraint or set of constraints as dynamic and expected to vary over time.

An additional technical benefit of a DQA system in accordance with aspects of the invention is that it maintains related values over several different time intervals, and time intervals where anomalous behavior is detected can be flagged. An example of anomalous behavior would be the value of related data points changing to values not seen before. The disclosed DQA system is configured to disclose time intervals to the user as anomalous. Anomalous time intervals can be left out or assigned a lower weight in calculating overall quality assessments.

An additional technical benefit of a DQA system in accordance with aspects of the invention is that it can handle different modalities of data (e.g., time series data and/or tabular data). The disclosed DQA system is configured to provide different data quality metrics for each of type of modality it has been configured to process.

An additional technical benefit of a DQA system in accordance with aspects of the invention is that it tailors the data quality metrics to the type of analytics tasks associated with the data. For example, classification tasks have certain data quality metrics associated with them, while regression or clustering tasks have other data quality metrics associated with them. More generally, a user may be performing a specific analytics task, perhaps involving some combination of regression, classification, and clustering. The disclosed DQA system can provide specific data quality metrics suited to such a specific task.

An additional technical benefit of a DQA system in accordance with aspects of the invention is that it is configured to maintain state information about previous computations. For example, the state information corresponding to computed data quality metrics can be maintained as the system computes data quality metrics for a new region. This state information can be maintained in a file system or database. For situations in which it is not feasible to use a file system or database to maintain state information, the disclosed DQA system is configured to pass state information between a client program accessing and the disclosed DQA system via an API. In this way, the disclosed DQA system generates the state variables, and once the state variables are created, they are passed between the disclosed DQA system and client programs via the API.

An additional technical benefit of a DQA system in accordance with aspects of the invention is that it efficiently manages the trade-offs between efficiency and accuracy of data quality metrics. Achieving the most accurate and up-to-date data quality metrics at all times can have prohibitive overhead. Thus, the disclosed DQA system makes appropriate trade-offs in providing reasonable data quality estimates while not using too many computational resources. The disclosed DQA system is configured to make electronically intelligent choices in both the frequency for recalculating data quality metrics and in selecting the most appropriate data quality metrics to recalculate.

An additional technical benefit of a DQA system in accordance with aspects of the invention is that it maintain information on the performance of different data quality metrics as a function of data size and possibly other characteristics of the data. The disclosed DQA system maintains historical data on the performance of the novel data quality metrics generated by the DQA system. As new data sets are analyzed, the disclosed DQA system maintains persistent information on performance and other execution characteristics in a history recorder (HR). The HR is analyzed to better understand the performance of our data quality metrics. The HR maintains information on execution of data quality metrics. Thus, for a given data set and data set size, the disclosed DQA system can estimate the overheads for different data quality metrics performed on that data set.

An additional technical benefit of a DQA system in accordance with aspects of the invention is that it maintains information on how data quality metrics change with changes in the data itself. The disclosed DQA system uses this information to predict how much data quality metrics would be expected to change in response to new data. Such change predictions can be made using simple calculations (e.g., using simulation algorithms) or more complex machine learning models.

An additional technical benefit of a DQA system in accordance with aspects of the invention is that it limits invocations of data quality metrics with high overhead, and data quality metrics with lower overhead can be executed more frequently.

An additional technical benefit of a DQA system in accordance with aspects of the invention is that it focuses on both the rate of change of data and the data quality metrics themselves. If the rate of change is higher, data quality metrics need to be recalculated more frequently.

An additional technical benefit of a DQA system in accordance with aspects of the invention is that, as more data are received, it can estimate using simple calculations and predictive models how much data quality metrics are expected to change. The disclosed DQA system is configured to recalculate data metrics which are expected to change the most.

An additional technical benefit of a DQA system in accordance with aspects of the invention is that, when it recalculates the novel data quality metrics described herein, updated information is generated on how much the data quality metrics have changed in response to changes in the data. This information can be used to update predictive models on how data quality metrics change with changes in the input data. In this way, as the disclosed DQA system executes, it becomes smarter over time in predicting the behavior of data quality metrics and more accurate in computing performance metrics (with limited computational resources) over time.

An additional technical benefit of a DQA system in accordance with aspects of the invention is that users have the ability to assign an importance score to data quality metrics. A higher importance score indicates that it is more important to have the most up-to-date scores for a data quality metric.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 27, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 27 are intended to be illustrative only and that computing nodes 10 and cloud computing environment 50 can communicate with any type of computerized device over any type of network and/or network addressable connection (e.g., using a web browser).

Figure 28:
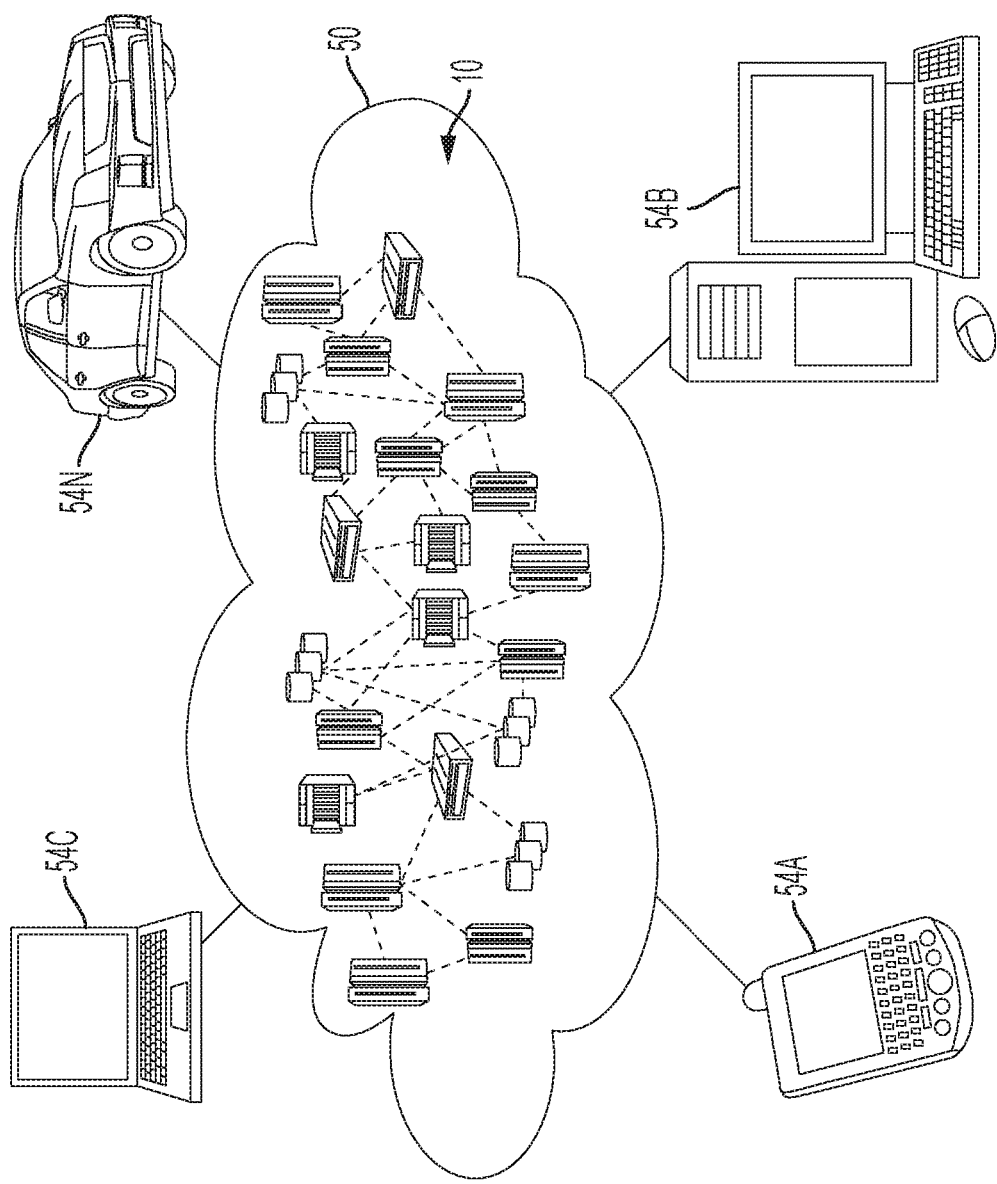
FIG. 28 depicts a cloud computing environment according to embodiments of the invention.
Figure 29:
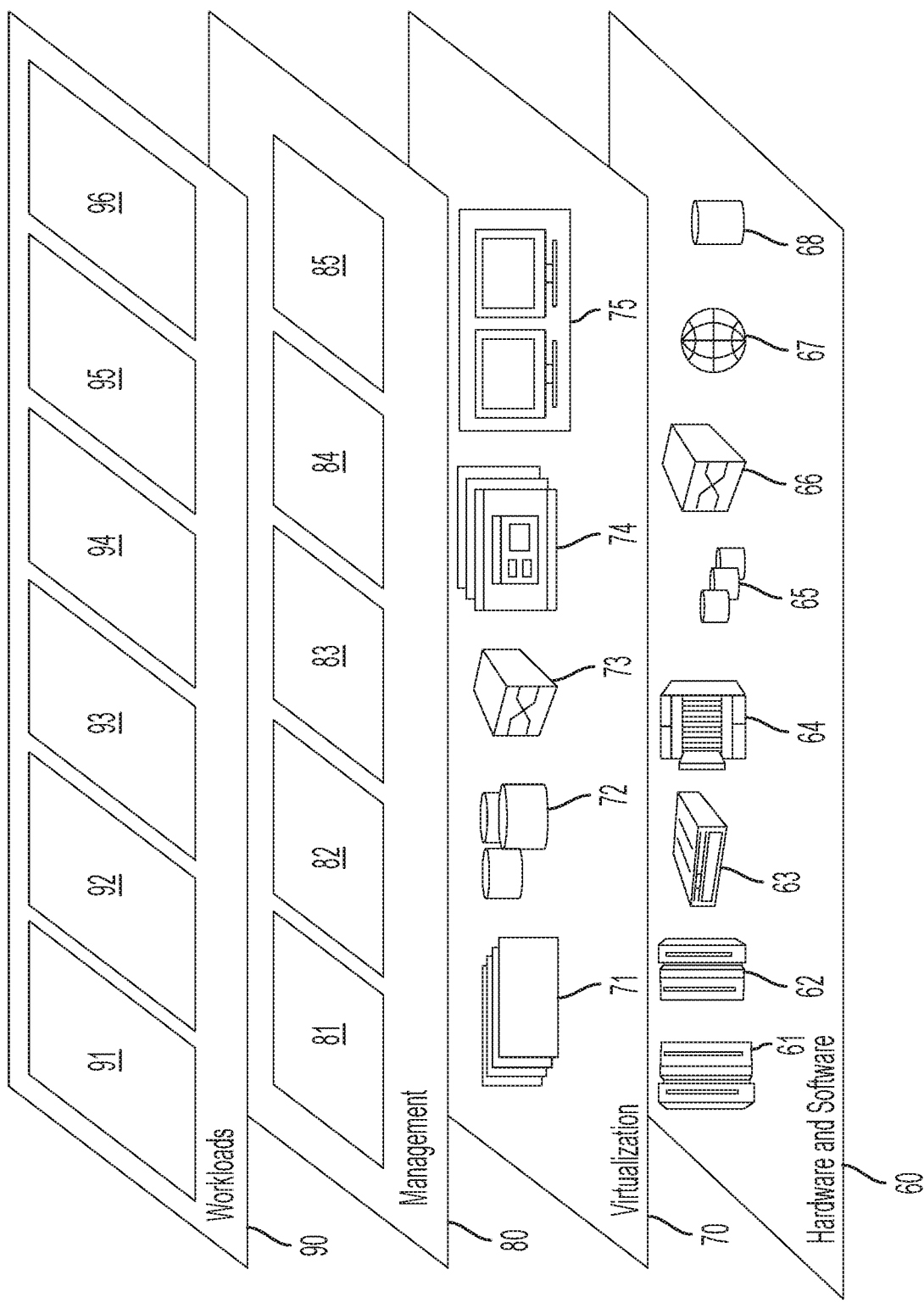
FIG. 29 depicts abstraction model layers according to an embodiment of the invention.

Referring now to FIG. 28, a set of functional abstraction layers provided by cloud computing environment 50 (FIG. 27) is shown. It should be understood in advance that the components, layers, and functions shown in FIG. 28 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performing efficient real-time data quality analysis 96.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for assessing data quality, the computer-implemented method comprising:
   receiving, using a processor, a plurality of updates to data points in a data stream;
   computing, using the processor, instances of a data quality metric (DQM) from the data points in the data stream;
   where the instances of the DQM are configured to differentiate the data points in the data stream by time and assign a higher weight to the instances of the DQM computed from more recent data points in the data stream; and
   continuously updating the instances of the DQM as more of the data points are received by the processor while limiting cycles of the processor consumed by updating the instances of the DQM to a threshold;
   where the DQM comprises an amount of NULL values in the data points of the data stream.

2. The computer-implemented method of claim 1 further comprising generating data quality assessments using the instances of the DQM across multiple time ranges.

3. The computer-implemented method of claim 2 further comprising selecting, using the processor, a data quality remediation strategy based at least in part on the data quality assessment.

4. The computer-implemented method of claim 3 further comprising applying, using the processor, the data quality remediation strategy to the data stream.

5. The computer-implemented method of claim 1, where the DQM is selected from the group consisting of:
   an amount of missing data points in the data stream;
   an amount of duplicate data points in the data stream;
   the amount of NULL values in the data points of the data stream; and
   a percentage of NULL values in the data points of the data stream.

6. A computer-implemented method for assessing data quality, the computer-implemented method comprising:
   receiving, using a processor, a plurality of updates to data points in a data stream;
   computing, using the processor, instances of a data quality metric (DQM) from the data points in the data stream;
   where the instances of the DQM are configured to differentiate the data points in the data stream by time and assign a higher weight to the instances of the DQM computed from more recent data points in the data stream; and
   continuously updating the instances of the DQM as more of the data points are received by the processor while limiting cycles of the processor consumed by updating the instances of the DQM to a threshold;
   where the DQM comprises a percentage of NULL values in the data points of the data stream.

7. The computer-implemented method of claim 6 further comprising generating data quality assessments using the instances of the DQM across multiple time ranges.

8. The computer-implemented method of claim 7 further comprising selecting, using the processor, a data quality remediation strategy based at least in part on the data quality assessment.

9. The computer-implemented method of claim 6 further comprising applying, using the processor, the data quality remediation strategy to the data stream.

10. The computer-implemented method of claim 6, where the DQM is selected from the group consisting of:
    an amount of missing data points in the data stream;
    an amount of duplicate data points in the data stream;
    an amount of NULL values in the data points of the data stream; and
    the percentage of NULL values in the data points of the data stream.

11. A computer system for assessing data quality, the computer system comprising a memory communicatively coupled to a processor, where the processor is configured to perform operations comprising:
    receiving a plurality of updates to data points in a data stream;
    computing instances of a data quality metric (DQM) from the data points in the data stream;
    where the instances of the DQM are configured to differentiate the data points in the data stream by time and assign a higher weight to the instances of the DQM computed from more recent data points in the data stream; and continuously updating the instances of the DQM as more of the data points are received by the processor while limiting cycles of the processor consumed by updating the instances of the DQM to a threshold where the DQM comprises an amount of NULL values in the data points of the data stream.

12. The computer system of claim 11, where the operations further comprise generating data quality assessments using the instances of the DQM across multiple time ranges.

13. The computer system of claim 12, where the operations further comprise selecting a data quality remediation strategy based at least in part on the data quality assessment.

14. The computer system of claim 13, where the operations further comprise applying the data quality remediation strategy to the data stream.

15. The computer system of claim 11, where the DQM is selected from the group consisting of:
an amount of missing data points in the data stream;
an amount of duplicate data points in the data stream;
the amount of NULL values in the data points of the data stream; and
the percentage of NULL values in the data points of the data stream.

16. A computer system for assessing data quality, the computer system comprising a memory communicatively coupled to a processor, where the processor is configured to perform operations comprising:
receiving a plurality of updates to data points in a data stream;
computing instances of a data quality metric (DQM) from the data points in the data stream;
analyzing instances of the DQM computed over a plurality of time intervals;
determining that at least one of the plurality of time intervals has an anomalous value for an instance of the DQM computed during the at least one of the plurality of time intervals; and
computing a weighted aggregate value of an instance of the DQM across the plurality of time intervals;
where instances of the DQM in time intervals of the plurality of time intervals with the anomalous value are assigned lower values of the weighted aggregate value; and
where the DQM comprises an amount of NULL values in the data points of the data stream.

17. The computer system of claim 16, where determining that the at least one of the plurality of time intervals has an anomalous value for the instance of the DQM computed during the at least one of the plurality of time intervals comprises analyzing patterns of the data points.

18. The computer system of claim 17, where analyzing the patterns of the data points comprises comparing the patterns of data points to expected patterns of the data points.

19. The computer system of claim 16, where the instances of the DQM in the time intervals of the plurality of time intervals with the anomalous value are assigned the lower values of the weighted aggregate value based on a computed severity level of the anomalous value.

20. The computer system of claim 16, where the DQM is selected from the group consisting of:
an amount of missing data points in the data stream;
an amount of duplicate data points in the data stream;
the amount of NULL values in the data points of the data stream; and
a percentage of NULL values in the data points of the data stream.

21. A computer program product for assessing data quality, the computer program product comprising a computer readable storage medium having program instructions embodied therewith, the program instructions executable by a processor system to cause the processor system to perform operations comprising:
receiving a plurality of updates to data points in a data stream;
computing instances of a data quality metric (DQM) from the data points in the data stream;
where the instances of the DQM are configured to differentiate the data points in the data stream by time and assign a higher weight to the instances of the DQM computed from more recent data points in the data stream; and
continuously updating the instances of the DQM as more of the data points are received by the processor while limiting cycles of the processor consumed by updating the instances of the DQM to a threshold;
where the DQM comprises an amount of NULL values in the data points of the data stream.

22. The computer program product of claim 21, where the operations further comprise:
analyzing instances of the DQM computed over a plurality of time intervals;
determining that at least one of the plurality of time intervals has an anomalous value for an instance of the DQM computed during the at least one of the plurality of time intervals; and
computing a weighted aggregate value of an instance of the DQM across the plurality of time intervals;
where instances of the DQM in time intervals of the plurality of time intervals with the anomalous value are assigned lower values of the weighted aggregate value.

23. The computer program product of claim 22, where the operations further comprise:
generating data quality assessments using the instances of the DQM across multiple time ranges;
selecting a data quality remediation strategy based at least in part on the data quality assessment; and
applying the data quality remediation strategy to the data stream.

24. The computer program product of claim 22, where determining that the at least one of the plurality of time intervals has an anomalous value for the instance of the DQM computed during the at least one of the plurality of time intervals comprises analyzing patterns of the data points.

25. The computer system of claim 24, where analyzing the patterns of the data points comprises comparing the patterns of data points to expected patterns of the data points.

* * * * *